US010858902B2

(12) United States Patent
Sizemore et al.

(10) Patent No.: US 10,858,902 B2
(45) Date of Patent: *Dec. 8, 2020

(54) FRAC MANIFOLD AND CONNECTOR

(71) Applicant: OIL STATES ENERGY SERVICES, L.L.C., Houston, TX (US)

(72) Inventors: Richard Brian Sizemore, White Oak, TX (US); Bob McGuire, Meridian, OK (US); Danny L. Artherholt, Asher, OK (US); Nicholas Langston, Yukon, OK (US); Blake Mullins, Edmond, OK (US); Mickey Claxton, Oklahoma City, OK (US); Charles Beedy, Oklahoma City, OK (US)

(73) Assignee: OIL STATES ENERGY SERVICES, L.L.C., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/911,150

(22) Filed: Jun. 24, 2020

(65) Prior Publication Data

US 2020/0340322 A1 Oct. 29, 2020

Related U.S. Application Data

(63) Continuation-in-part of application No. 16/850,414, filed on Apr. 16, 2020.

(Continued)

(51) Int. Cl.
*E21B 33/03* (2006.01)
*E21B 43/26* (2006.01)
(Continued)

(52) U.S. Cl.
CPC .......... *E21B 33/03* (2013.01); *E21B 43/2607* (2020.05); *F16K 3/24* (2013.01);
(Continued)

(58) Field of Classification Search
CPC ...... E21B 43/2607; E21B 33/03; F16L 41/03; F16K 3/314; F16K 3/24; F16K 31/122
See application file for complete search history.

(56) References Cited

U.S. PATENT DOCUMENTS

| 969,358 A | 9/1910 | Goodall |
| 1,301,243 A | 4/1919 | Ford |

(Continued)

FOREIGN PATENT DOCUMENTS

| CA | 2195118 | 7/1998 |
| NL | 7611253 | 4/1978 |
| WO | 2018049360 | 3/2018 |

OTHER PUBLICATIONS

Canada Patent Office; CA 3047245; Office Action; dated Jan. 15, 2020.

(Continued)

*Primary Examiner* — Brad Harcourt
(74) *Attorney, Agent, or Firm* — Morgan, Lewis & Bockius LLP

(57) ABSTRACT

A well configuration unit configured to connect to a zipper manifold, and comprising a bridge connector header comprising an axial throughbore and a horizontal throughbore. A frac manifold connector is connected to the axial throughbore of the bridge connector header and comprises a mandrel that is axially movable and a hydraulic setting tool configured to move the mandrel from an open position, in which fracturing fluid is allowed to flow from the zipper manifold to a connected frac tree, to a closed position, in which the mandrel and its associated cup tool prevent fracturing fluid from flowing to the connected frac tree. A bridge connector is connected to the horizontal throughbore of the bridge connector header and comprises two bridge spools configured to connect the zipper manifold to the same frac tree.

11 Claims, 34 Drawing Sheets

Related U.S. Application Data

(60) Provisional application No. 62/838,026, filed on Apr. 24, 2019.

(51) Int. Cl.
*F16K 3/314* (2006.01)
*F16K 3/24* (2006.01)
*F16K 31/122* (2006.01)
*F16L 41/03* (2006.01)

(52) U.S. Cl.
CPC .............. *F16K 3/314* (2013.01); *F16K 31/122* (2013.01); *F16L 41/03* (2013.01)

(56) References Cited

U.S. PATENT DOCUMENTS

| | | | |
|---|---|---|---|
| 1,334,007 A | 3/1920 | White | |
| 1,471,045 A | 10/1923 | Maupin et al. | |
| 2,143,568 A | 1/1939 | Munro | |
| 2,359,846 A | 10/1944 | Hayman | |
| 2,390,445 A | 12/1945 | Mercier | |
| 2,533,097 A | 12/1950 | Dale | |
| 2,927,643 A | 3/1960 | Dellinger | |
| 3,223,112 A | 12/1965 | Ashbrook | |
| 3,830,304 A | 8/1974 | Cummins | |
| 3,924,678 A | 12/1975 | Ahlstone | |
| 4,076,079 A | 2/1978 | Herricks et al. | |
| 4,241,786 A | 12/1980 | Bullen | |
| 4,252,348 A | 2/1981 | Kojima | |
| 4,436,325 A | 3/1984 | Miller | |
| 4,477,052 A | 10/1984 | Knoblauch | |
| 4,632,183 A | 12/1986 | McLeod | |
| 4,867,243 A | 9/1989 | Garner et al. | |
| 5,069,288 A | 12/1991 | Sinigeetham | |
| 5,080,174 A | 1/1992 | Hynes | |
| 5,145,006 A | 9/1992 | June | |
| 5,247,997 A | 9/1993 | Pucci | |
| 5,332,044 A | 7/1994 | Dallas et al. | |
| 5,372,202 A * | 12/1994 | Dallas .................. | E21B 33/068 166/386 |
| 5,411,081 A | 5/1995 | Moore et al. | |
| 5,540,282 A | 7/1996 | Dallas | |
| 5,785,121 A | 7/1998 | Dallas | |
| 5,819,851 A | 10/1998 | Dallas | |
| 5,927,403 A | 7/1999 | Dallas | |
| 6,009,941 A | 1/2000 | Haynes | |
| 6,019,175 A | 2/2000 | Haynes | |
| 6,106,024 A | 8/2000 | Herman et al. | |
| 6,179,053 B1 | 1/2001 | Dallas | |
| 6,220,363 B1 | 4/2001 | Dallas | |
| 6,289,993 B1 | 9/2001 | Dallas | |
| 6,471,249 B1 | 10/2002 | Lewis | |
| 7,775,288 B2 * | 8/2010 | Hickie .................. | E21B 33/068 166/379 |
| 8,777,274 B2 | 7/2014 | Chou | |
| 8,839,867 B2 | 9/2014 | Conrad | |
| 8,978,763 B2 | 3/2015 | Guidry | |
| 8,991,873 B2 | 3/2015 | Weinhold | |
| 9,068,450 B2 | 6/2015 | Guidry | |
| 9,222,345 B2 | 12/2015 | Conrad | |
| 9,255,469 B2 | 2/2016 | Conrad | |
| 9,518,430 B2 | 12/2016 | Guidry | |
| 9,631,469 B2 | 4/2017 | Guidry et al. | |
| 9,903,190 B2 | 2/2018 | Conrad et al. | |
| 9,915,132 B2 | 3/2018 | Conrad | |
| 9,932,800 B2 | 7/2018 | Guidry | |
| 10,094,195 B2 | 10/2018 | Guidry | |
| 10,132,146 B2 | 11/2018 | Guidry | |
| 10,570,692 B1 * | 2/2020 | Sizemore ................ | E21B 43/26 |
| 2006/0185841 A1 | 8/2006 | Swagerty et al. | |
| 2006/0197342 A1 | 9/2006 | Yen | |
| 2007/0251578 A1 | 11/2007 | McGuire | |
| 2009/0090515 A1 | 4/2009 | Chan et al. | |
| 2009/0114392 A1 | 5/2009 | Tolman et al. | |
| 2009/0194273 A1 | 8/2009 | Surjaatmadja et al. | |
| 2009/0261575 A1 | 10/2009 | Bull et al. | |
| 2010/0051261 A1 | 3/2010 | Koleilat et al. | |
| 2010/0300672 A1 | 12/2010 | Childress et al. | |
| 2011/0108275 A1 | 5/2011 | Borak et al. | |
| 2012/0181015 A1 | 7/2012 | Karjaria et al. | |
| 2012/0181030 A1 | 7/2012 | Kajaria et al. | |
| 2013/0032328 A1 | 2/2013 | Guidry et al. | |
| 2013/0075080 A1 | 3/2013 | Guidry | |
| 2013/0175039 A1 | 7/2013 | Guidry | |
| 2014/0311753 A1 | 10/2014 | Hanson et al. | |
| 2014/0352968 A1 * | 12/2014 | Pitcher ................... | E21B 43/26 166/308.1 |
| 2015/0047714 A1 | 2/2015 | Doig | |
| 2016/0115773 A1 | 4/2016 | Conrad et al. | |
| 2017/0198548 A1 | 7/2017 | James | |
| 2017/0350223 A1 | 12/2017 | Guidry et al. | |
| 2017/0370172 A1 | 12/2017 | Tran et al. | |
| 2018/0058171 A1 | 3/2018 | Roesner et al. | |
| 2018/0187537 A1 | 7/2018 | Hill et al. | |
| 2018/0223621 A1 | 8/2018 | McGuire et al. | |
| 2018/0284816 A1 | 10/2018 | Cook et al. | |
| 2018/0291718 A1 | 10/2018 | Conrad et al. | |
| 2018/0298735 A1 | 10/2018 | Conrad | |
| 2018/0347286 A1 | 12/2018 | Scott et al. | |
| 2019/0040707 A1 | 2/2019 | Guidry | |
| 2019/0093444 A1 | 3/2019 | Guidry | |
| 2020/0032608 A1 | 1/2020 | Christoperson et al. | |
| 2020/0032609 A1 | 1/2020 | Guidry | |

OTHER PUBLICATIONS

Patent Cooperation Treaty; PCT/US 19/64283; International Search Report and Written Opinion; dated Feb. 26, 2020.
Patent Cooperation Treaty; PCT/US2020/028452; International Search Report and Written Opinion; dated Jul. 17, 2020.
Patent Cooperation Treaty; PCT/US20/39417; International Search Report and Written Opinion; dated Sep. 10, 2020.
Trigger Energy, Where Integrity Meets Innovation!, Wellhead & Fracturing Equipment, Website: https://trigger-energy.com/#equipment—Jun. 17, 2019—© Trigger Energy Inc. 2018. All Rights Reserved.
Schlumberger; Monoline Flanged-Connection Fracturing Fluid Delivery Technology, Website: https://www.slb.com/services/completions/stimulation/cameron-fracturing-services-equipment/monoline-technology.aspx—Jun. 17, 2019 © 2019 Schlumberger Limited. All rights reserved.

* cited by examiner

FRAC MANIFOLD AND CONNECTOR

TECHNICAL FIELD

The present disclosure relates generally to oil or gas wellbore equipment, and, more particularly, to a frac manifold and its connection to a wellhead.

BACKGROUND

Frac manifolds, also referred to herein as zipper manifolds, are designed to allow hydraulic fracturing operations on multiple wells using a single frac pump output source. Frac manifolds are positioned between the frac pump output and frac trees of individual wells. A frac manifold system receives fracturing fluid from the pump output and directs it to one of many frac trees. Fracturing fluid flow is controlled by operating valves to isolate output to a single tree for fracking operations.

Frac zipper manifolds may be rigged up to frac trees before frac equipment arrives at the well site. Once onsite, the frac equipment need only be connected to the input of the frac manifold. Because individual frac trees do not need to be rigged up and down for each fracking stage and because the same frac equipment can be used for fracking operations on multiple wells, zipper manifolds reduce downtime for fracking operations while also increasing safety and productivity. Another benefit includes reducing equipment clutter at a well site.

Despite their benefits, further efficiencies and cost savings for zipper manifolds may be gained through improved designs. In particular, the valves that have traditionally been used to control the flow of fracturing fluid to individual trees are expensive and greatly increase the cost of using a zipper manifold. With multiple valves required for each frac tree, when a zipper manifold is arranged to connect to several adjacent wells, the cost of the valves can easily be several hundred thousand dollars.

Additionally, treatment fluid in the zipper manifold typically passes to frac trees via goat heads or frac heads and frac iron, but there are several drawbacks to using such setups to span the distance between the zipper manifold and each frac tree. Goat heads, or frac heads, traditionally employ multiple downlines and restraints that clutter the area between the zipper manifold and the frac tree, which can make for a more difficult and less safe work environment to operate and maintain the frac equipment.

Some designs have been developed to avoid using frac iron. One design uses a single line made from studded elbow blocks and flow spools with swiveling flanges. Such a design is disclosed in, for example, U.S. Pat. Nos. 9,932,800, 9,518,430, and 9,068,450. A similar design is currently offered for sale by Cameron International of Houston, Tex., under the brand name Monoline. One drawback of this design is that the weight of the equipment combined with the potentially awkward orientation of the lines can make installation difficult and can place uneven or increased stress on the connections to the frac manifold and/or the frac tree. Another drawback is that using a single line to connect the frac manifold to the frac tree can lead to increased velocity and turbulence of the flow, when compared to using multiple lines. Such conditions may lead to a greater risk of erosion in the frac tree. Replacing a damaged frac tree can be very expensive and time-consuming.

Accordingly, what is needed is an apparatus, system, or method that addresses one or more of the foregoing issues related to frac zipper manifolds, among one or more other issues.

SUMMARY OF THE INVENTION

The present invention utilizes a combination of novel approaches to the use of frac manifolds. First, the invention involves a frac manifold isolation tool comprising one or more mandrels that may be hydraulically positioned to control frac fluid flow to one or more outputs of the manifold. When the mandrel is in the open position, frac fluid is able to flow to a bridge that is connected to a frac tree, through which the connected well can be fracked. When in the closed position, the mandrel stops flow to the bridge. With this design, the mandrel can serve to replace or reduce the number of valves that would otherwise control fluid in the manifold, thus making the use of a frac manifold much less expensive and more efficient.

Second, the bridge connector between the frac manifold and the frac tree comprises two parallel passages. With this bridge design, multiple frac iron lines between the zipper manifold and the frac tree are eliminated while providing for a robust, durable connection which may be adjusted to accommodate different configurations of zipper manifolds and frac trees.

BRIEF DESCRIPTION OF THE DRAWINGS

Various embodiments of the present disclosure will be understood more fully from the detailed description given below and from the accompanying drawings of various embodiments of the disclosure. In the drawings, like reference numbers may indicate identical or functionally similar elements.

DETAILED DESCRIPTION

Figure 1:
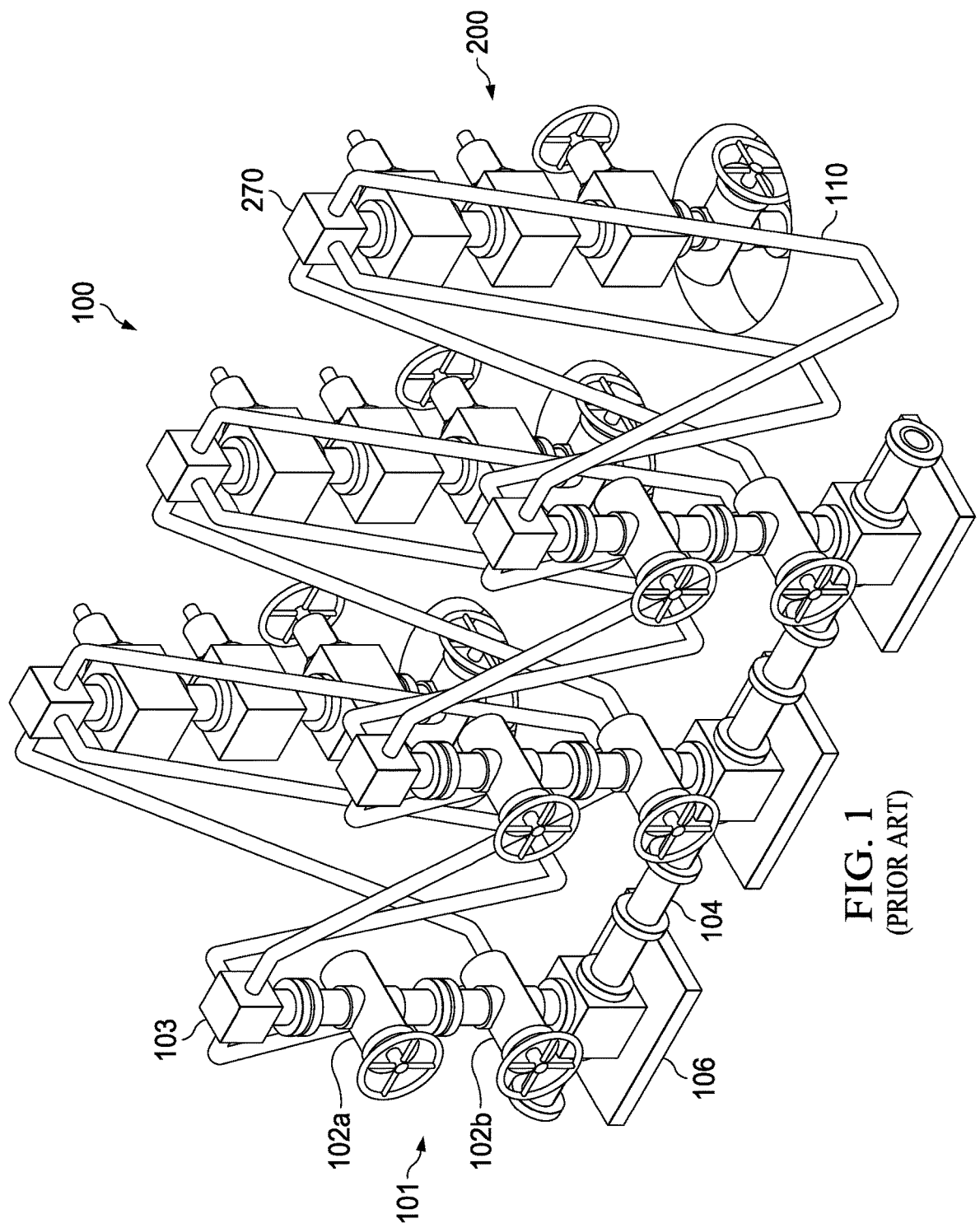
FIG. 1 illustrates a zipper manifold as known in the prior art.

FIG. 1 illustrates an example of a prior art zipper manifold 100. The manifold may be positioned vertically, as shown in FIG. 1, or it may be positioned horizontally. The frac manifold 100 can include two or more well configuration units 101. Each well configuration unit 101 includes one or more valves 102 and a bridge connector header 103, and the well configuration units 101 may be collectively or individually (as shown) positioned on skids 106. Each bridge connector header 103 connects to a similar header 270 on the frac tree 200. Prior art bridge connector headers 103 are often called frac heads or goat heads and may include multiple fluid connection points, as shown in FIG. 1. Each fluid connection point attaches to a downline 110 that is routed to the ground before turning back up and connecting to a connection point on the frac tree header 270 of the frac tree 200. The use of downlines 110 allows operators to adjust for different distances between and relative locations of the frac manifold 100. The downlines 110 typically have small diameters, which limits the flow therethrough. The multiple lines and the restraints for those lines create clutter between the zipper manifold and the frac tree, which can make maintenance difficult and increase safety concerns. Each well configuration unit 101 typically includes a hydraulically actuated valve 102a and a manually actuated valve 102b. The well configuration units 101 of the zipper manifold 100 are connected together by zipper spools 104, and the final zipper spool 104 may be capped off or connected to other well configurations 101 as needed. The zipper manifold 100 connects to the output of the frac pump at the frac supply header 105.

In operation, the valves 102 of one well configuration unit 101 are opened to allow fluid flow to the corresponding frac tree 200 through its connection header 103 while the valves 102 of other well configuration units 101 in the zipper manifold 100 are closed. The valves 102 may be closed and opened to control the flow through different well configuration units 101 of the zipper manifold 100.

Overview of Improved Well Configuration Unit

Figure 2:
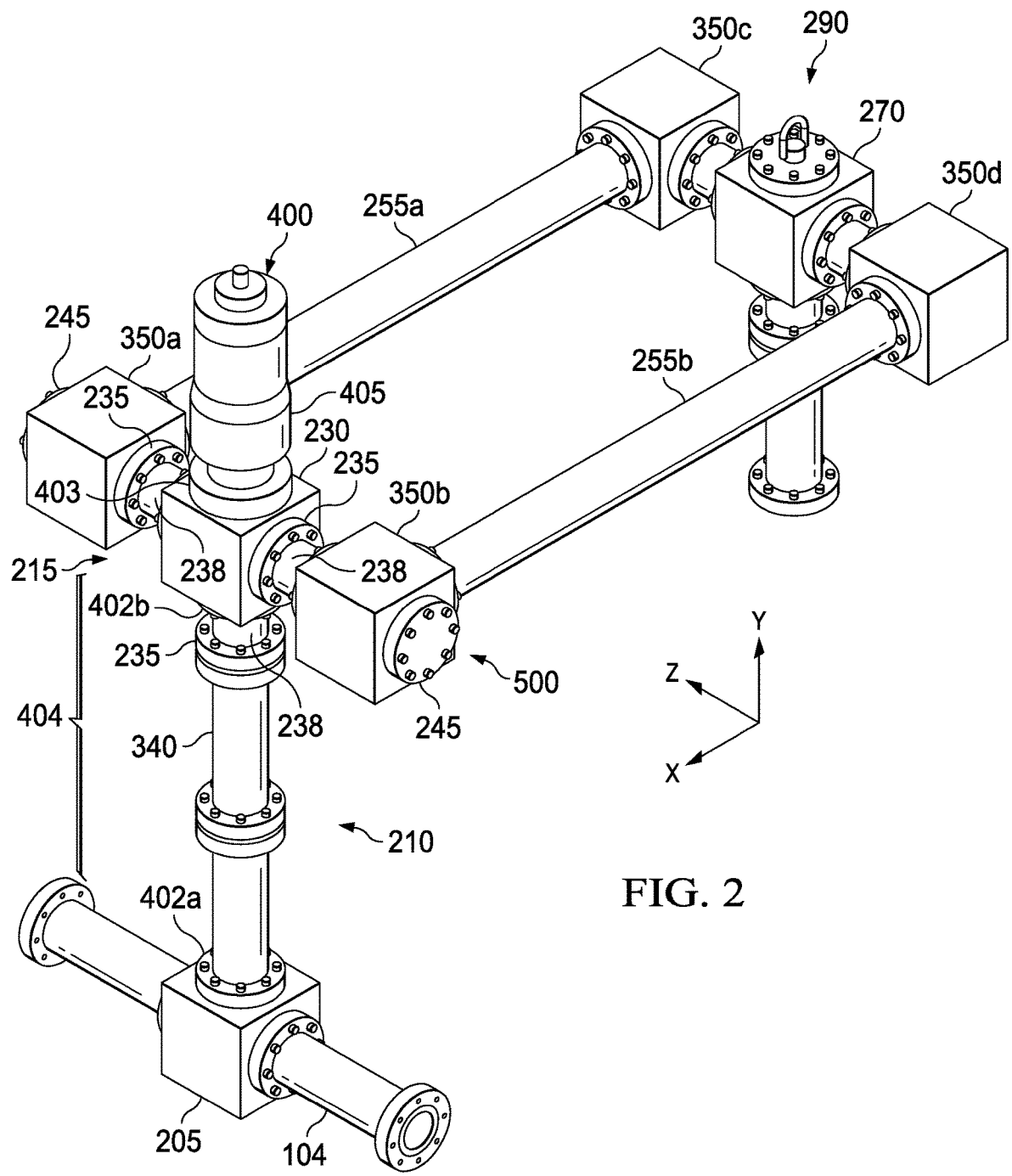
FIG. 2 illustrates an elevated perspective view of an improved zipper manifold with a mandrel in the closed position and a dual-spool bridge connector from the manifold to the frac tree.
Figure 3:
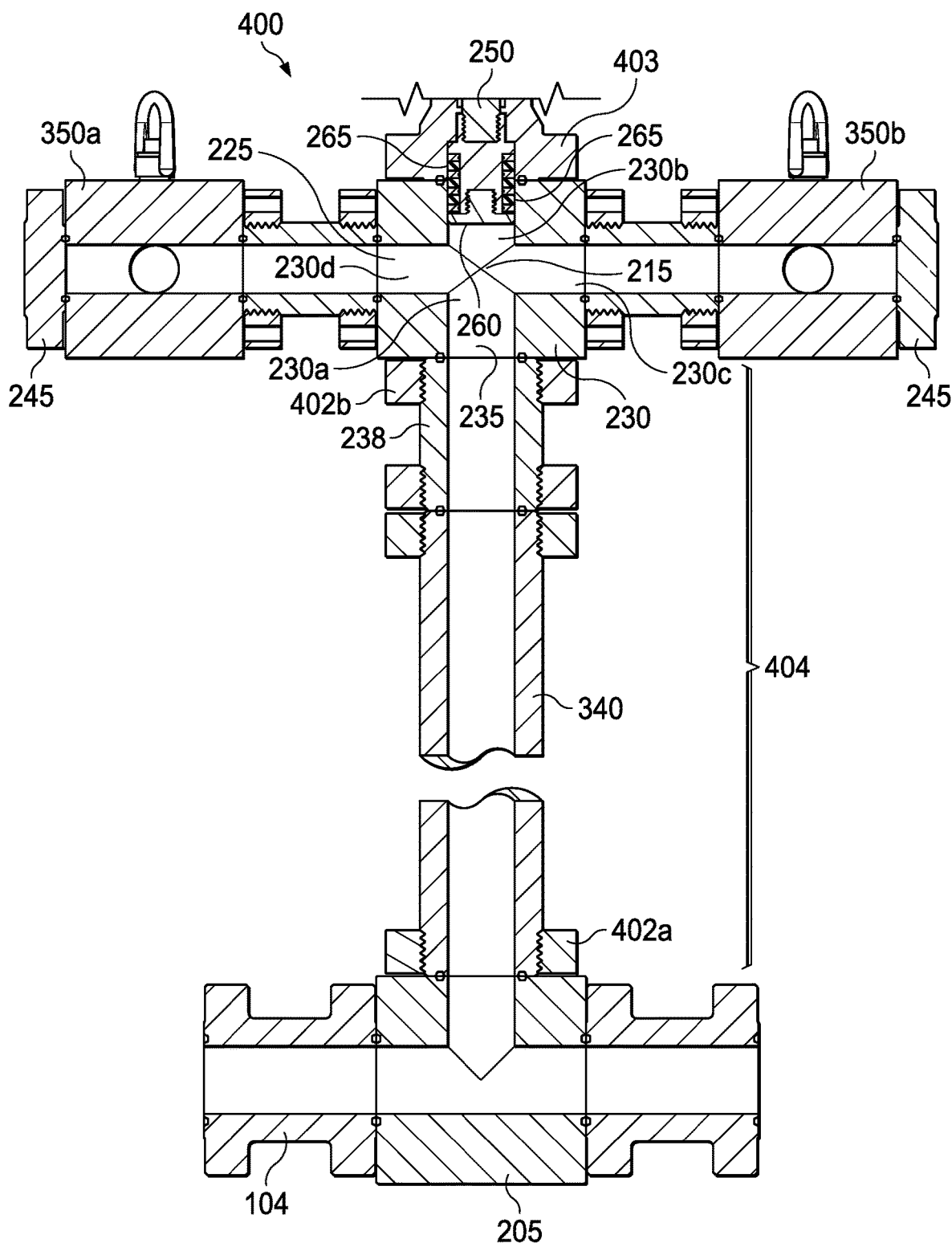
FIG. 3 illustrates an improved zipper manifold with a mandrel in the open position.

FIG. 2 illustrates an exemplary embodiment of an improved well configuration unit 210. Improved well configuration unit 210 includes frac manifold connector 400 and bridge connector 500, both of which are connected to bridge connector header 230, as shown in FIG. 2 and discussed below in further detail. As shown in FIG. 3, bridge connector header 230 comprises a horizontal throughbore 225 with side openings 230c and 230d, as well as an axial throughbore 235 with lower opening 230a and upper opening 230b, thus forming "T" junction 215 by connecting to a lower bore, such as that shown within short spool 238 and/or lower spool 340.

Frac manifold connector 400 may comprise lower assembly 404, as shown in FIG. 3. If present, lower assembly 404 connects at one end via flange 402a to connection block 205, which is connected on one or more sides to zipper spool 104. Lower assembly 404 may comprise one or more zipper spools 340 connected to flange 402a, in which case the uppermost zipper spool 340 connects via flange 402b to lower opening 230a in bridge connector 230. Uppermost zipper spool 340 may comprise short spool 238 as shown in FIG. 2 and discussed in further detail below. Lower assembly 404 is optional, such that lower opening 230a in bridge connector 230 may connect directly via flange 402a to connection block 205.

Figure 4:
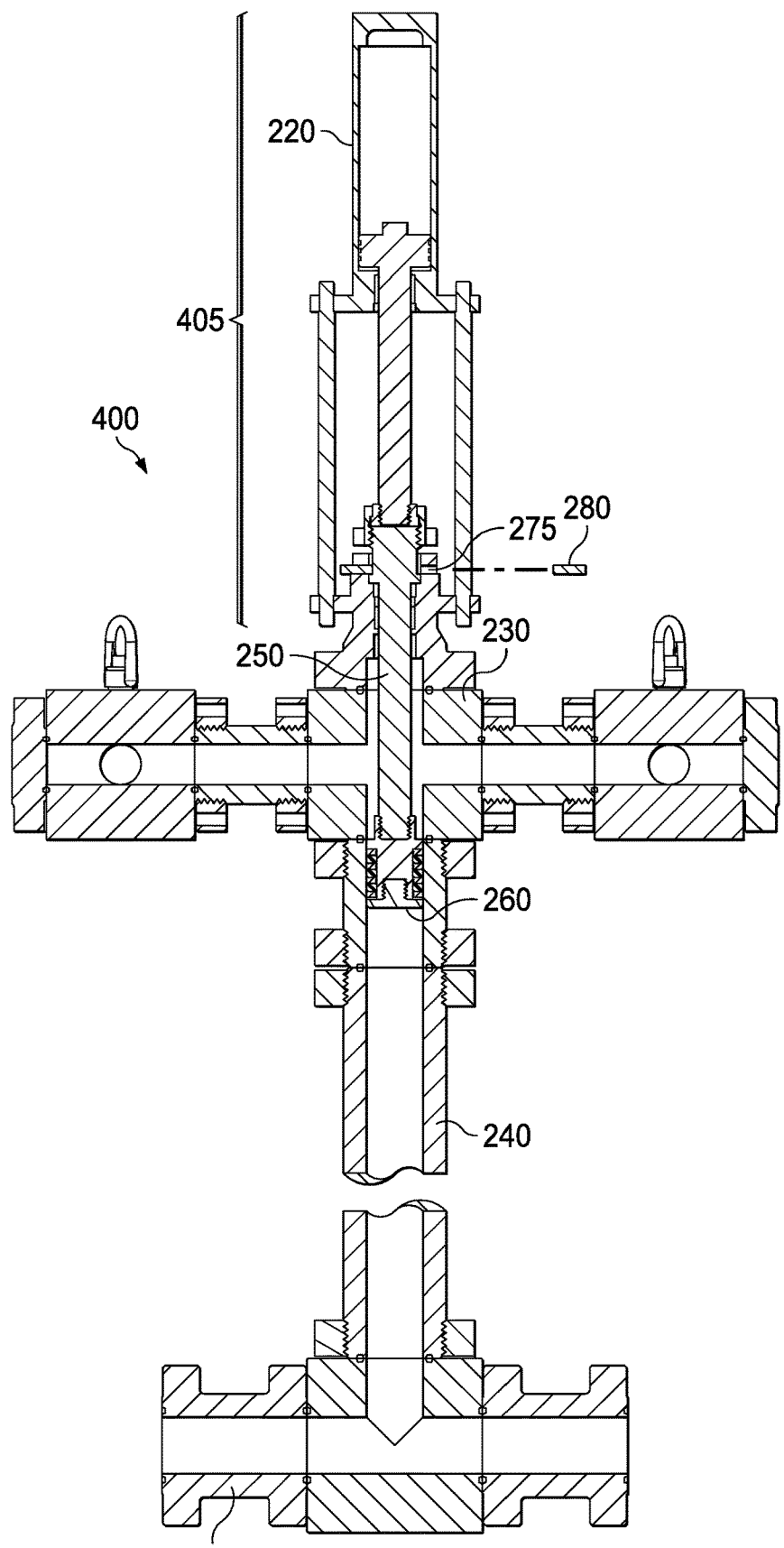
FIG. 4 illustrates an improved zipper manifold with a hydraulic setting cylinder and a mandrel in the closed position.

Frac manifold connector 400 comprises an upper assembly 405, as shown in FIG. 4. Upper assembly 405 connects via flange 403 to upper opening 230b in bridge connector 230. Upper assembly 405 is depicted in FIG. 4 and discussed below in further detail.

Bridge connector 500 comprises studded blocks 350a and 350b, which are each fluidly connected respectively to one end of bridge spools 255a and 255b. The other end of bridge spools 255a and 255b connect respectively to studded blocks 350c and 350d, which are each fluidly connected to frac tree header 270 on the frac tree.

Details of Frac Manifold Connector

Upper assembly 405 of frac manifold connector 400 may include a hydraulic setting cylinder 220 (as shown in FIG. 4) connected to a mandrel 250. Hydraulic setting cylinder 220 actuates a mandrel 250 that moves within throughbore 235 and axially in line with the lower bore, e.g., lower spool 340. In the embodiment shown in FIG. 2, as described in more detail below, the hydraulic setting cylinder 220 and mandrel 250 are used in place of valves in the well configuration unit 210. In another embodiment, valves (whether manually or hydraulically actuated) may be used in conjunction with the hydraulic setting cylinder 220 and mandrel 250 in a well configuration unit 210 to control fluid flow.

Two or more well configuration units 210 are used in a zipper manifold to provide connectivity and fluid control to multiple frac trees and wells. Improved well configuration units 210 are fluidly connected through zipper spools 104 along the zipper manifold. A frac supply header 105 (similar to that shown in FIG. 1) provides fluid connectivity from the frac pump to the zipper manifold and zipper spools 104.

The hydraulic setting cylinder 220 moves the mandrel 250 into two primary positions. When the well configuration unit 210 is in the open position, which is shown in FIG. 3, the cup 260 of the mandrel 250 sits above bridge connector header 230, which allows fluid to flow from the zipper spool 104, through the lower spool 340, and through the "T" junction 215 of the bridge connector header 230 to the bridge connector 500 and frac tree 290. The mandrel 250 is solid at the cup 260 such that fluid does not flow through the mandrel 250. The cup 260 includes one or more seals 265, such as o-rings, that are able to form a seal against an inner spool above the "T" junction 215 of the bridge connector header 230 and prevent pressure leaks and fluid flow around the cup 260 and to the hydraulic setting cylinder 220.

Figure 5:
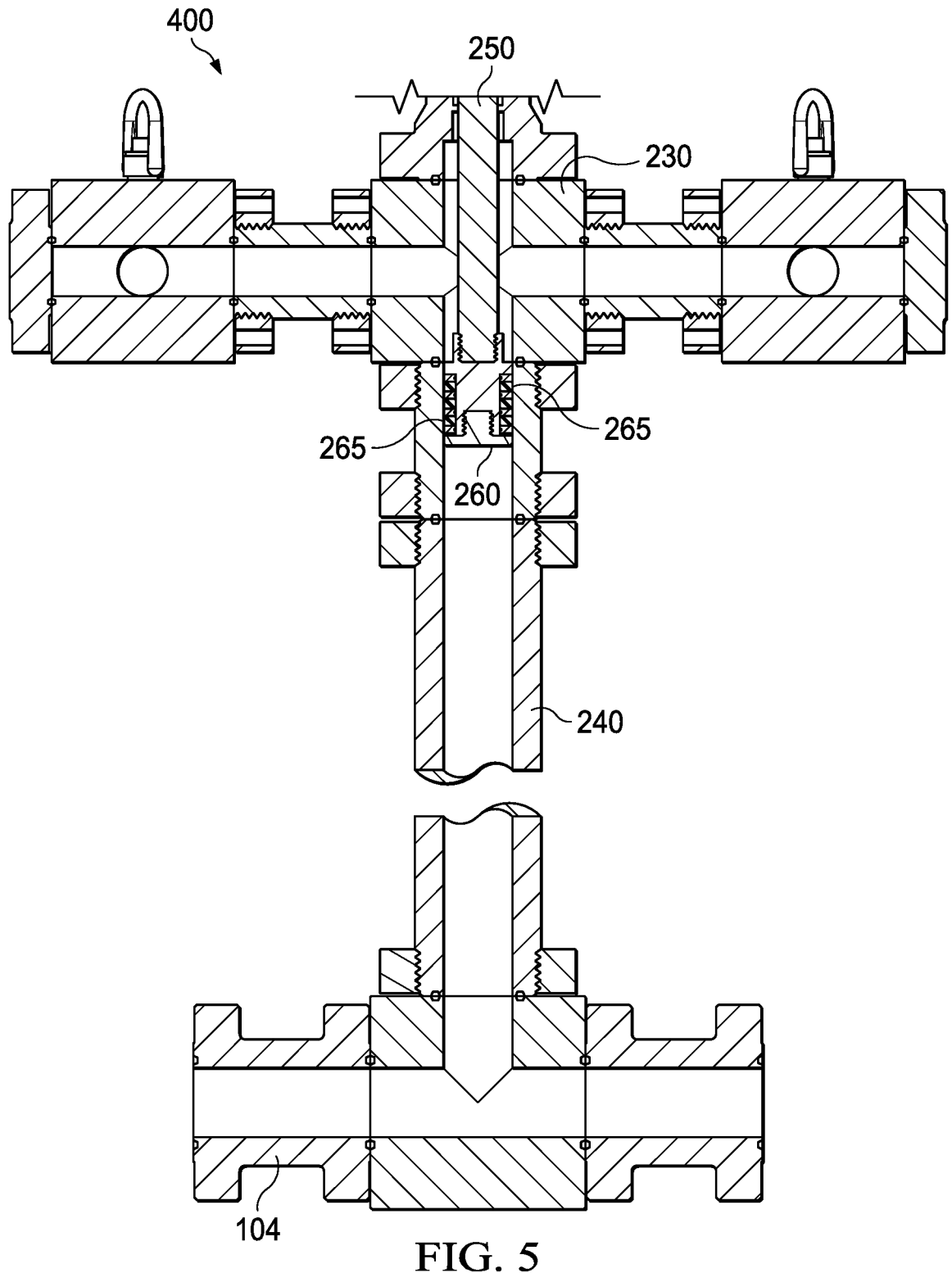
FIG. 5 is an enlarged view of the lower portion of the improved zipper manifold shown in FIG. 4.

In the closed position, which is shown in FIGS. 4-5, the hydraulic setting cylinder 220 may move the mandrel 250 through the "T" junction 215 of the bridge connector header 230, such that the cup 260 of the mandrel 250 will seat at a location below the "T" junction. The cup 260 may optionally seal within lower spool 340, where seals 265 form a seal against the inner surface of lower spool 340, which is preferably corrosion resistant. Alternatively, some or all of cup 260 may form a seal with the inner surface of bridge connector header 230, as long as the seal is formed below the "T" junction 215. When the mandrel 250 is in the closed position and a seal has been formed at a location below the junction of bridge connector header 230, fluid cannot flow past the cup 260 to the bridge connection header 230.

In an embodiment, which is shown in FIGS. 3-5, the inner diameter of the lower spool 340 lower opening 230a of bridge connector 230 is consistent, and the mandrel 250 is stroked to a location far enough down below the "T" junction of bridge connector 230 to allow mandrel cup 260 to seal. The mandrel cup seals 265 may form a seal with the inner surface of the lower spool 340 and/or the inner surface of bridge connector 230 when the mandrel cup 260 is axially compressed and the seals 265 extrude radially outward. The mandrel cup 260 will axially compress when the pressure below the mandrel cup 260 sufficiently exceeds the pressure above it, or in other words, when the pressure differential exceeds a particular threshold. The mandrel 250 is preferably moved from one position to another only when a seal has not been formed to avoid damaging the sealing elements. Thus, before the mandrel 250 is moved, the pressure above and below the mandrel cup 260 may be equalized, which will decompress the mandrel cup 260 and disengage the seals 265 from the inner surface of the spool.

In an embodiment, the mandrel cup 260 may be actuated to seat at or near an inner shoulder on the inner surface of the lower spool 340. In an embodiment, the inner shoulder serves as a physical stop for the actuation of the hydraulic setting cylinder 220, and the inner shoulder itself may be used as a stop against which to compress the mandrel cup 260, such that it forms a seal with the inner surface of the lower spool 340.

In an embodiment, the mandrel 250 may include one or more locking mechanisms. FIG. 4 illustrates an example of a hydraulic setting cylinder 220 that is connected on top of the bridge connection header 230. The hydraulic setting cylinder 220 includes a mandrel lock 275. The mandrel lock 275 accommodates a lock pin 280 that may be actuated by a second hydraulic cylinder (not shown). After the mandrel 250 has been stroked down to allow mandrel cup 260 to seal in the lower spool 340 and/or the inner surface of bridge connector 230, the lock pin can be actuated into mandrel lock 275 to mechanically fix the mandrel 250 into position. Other types of locking mechanisms may also be used, such as cams, dogs, or wing nuts.

The hydraulic setting cylinder 220 may be electronically controlled to actuate the mandrel 250. Similarly, the back-up mechanism, such as lock pin and mandrel lock 275 system, may also be actuated electronically or pneumatically. In this way, the flow paths within the zipper manifold 104 may be opened and closed remotely, thus enhancing worker safety. As described above, in an embodiment, manually actuated valves may also be used as an alternative or a backup to the hydraulically actuated cylinder 220.

Figure 6:
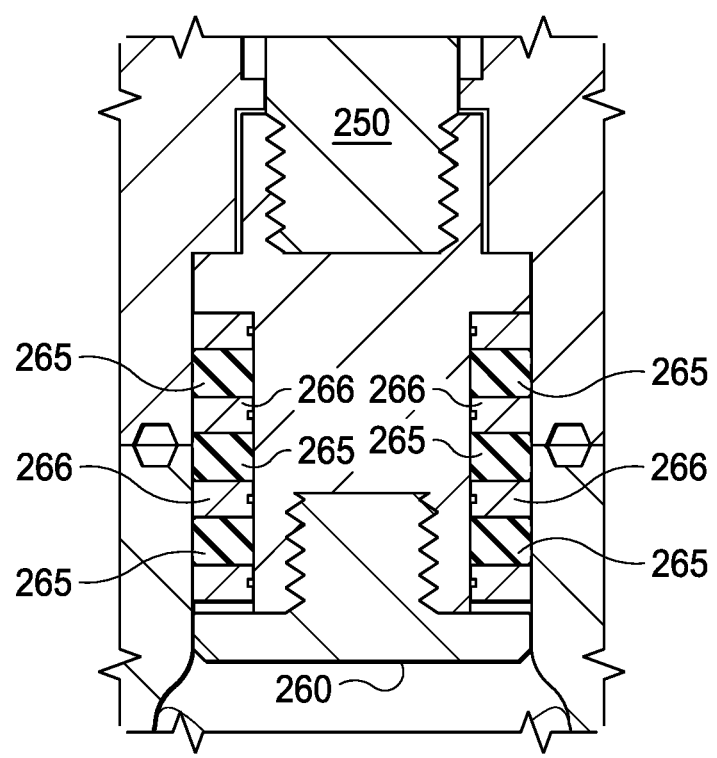
FIG. 6 is an enlarged view of a mandrel cup tool.

FIG. 6 illustrates a close up view of an exemplary sealing configuration for a mandrel cup tool 260. Cup tool 260 has o-rings 265 and plates 266, which act as pack off seals with the inner surface of the spools when the mandrel 250 is either above or below the bridge header connection 230.

Figure 7:
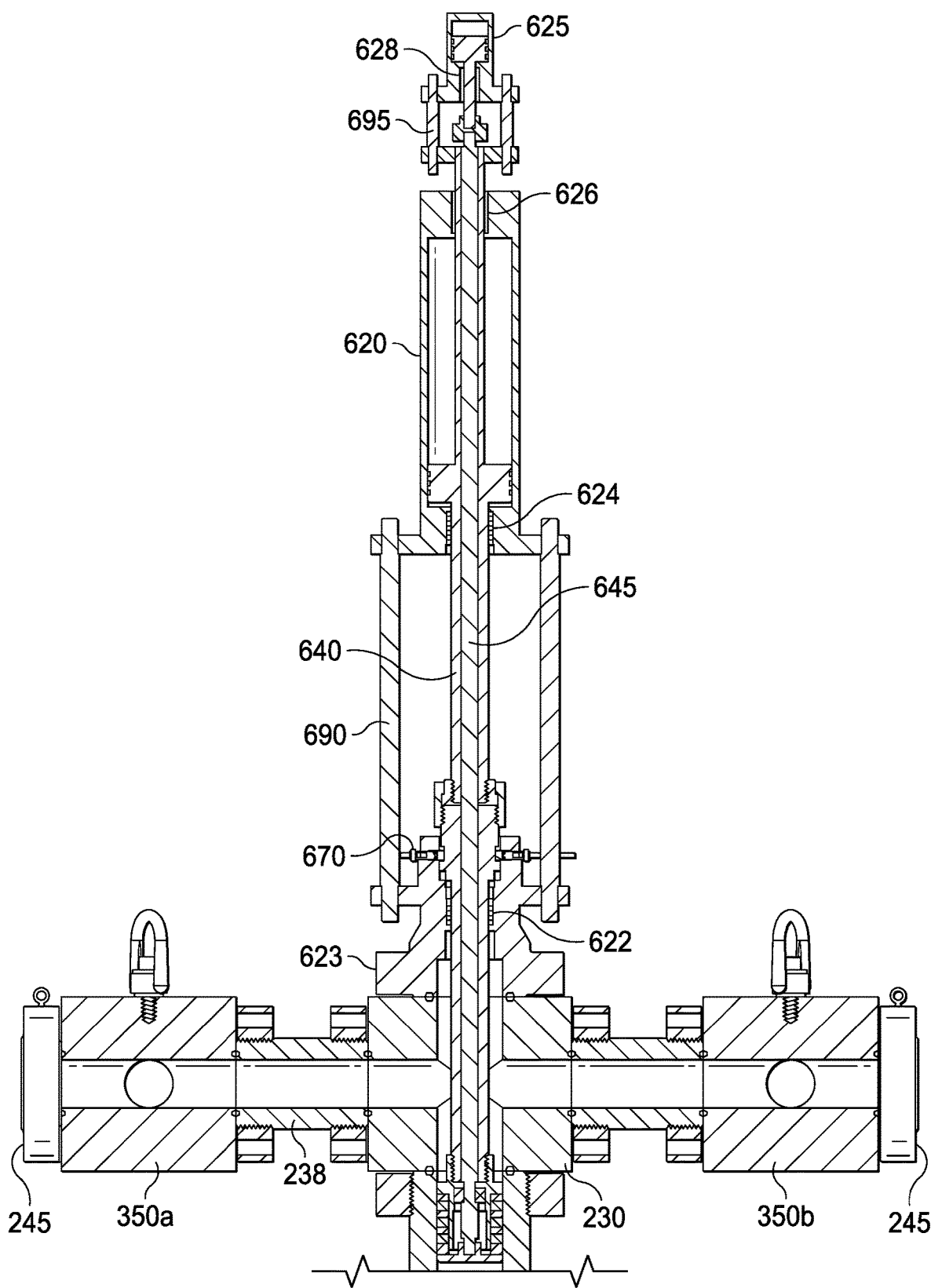
FIG. 7 illustrates an embodiment of a hydraulic setting cylinder with two mandrels and stay rods.
Figure 8:
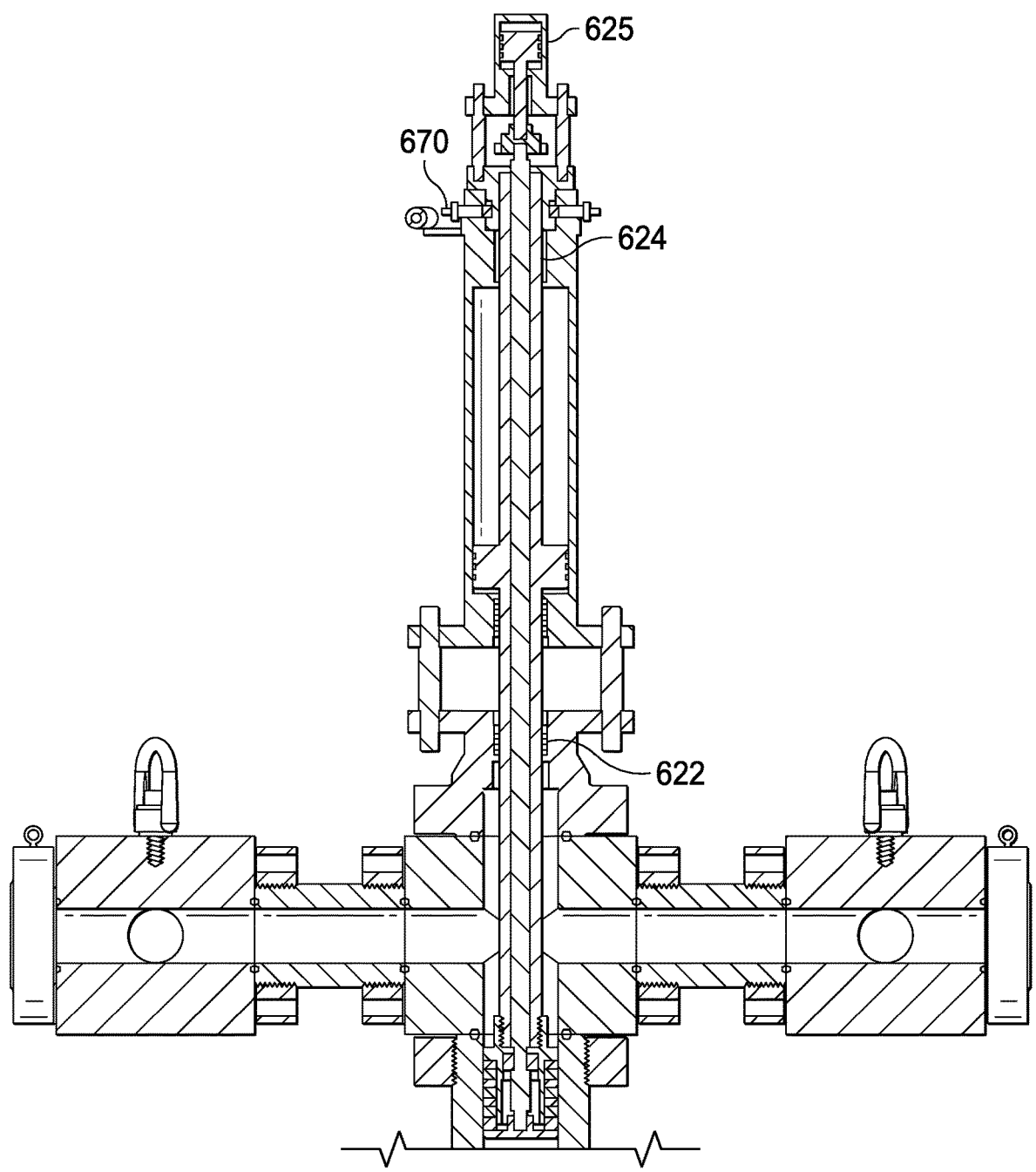
FIG. 8 illustrates an embodiment of a hydraulic setting cylinder with two mandrels and stay rods.
Figure 9:
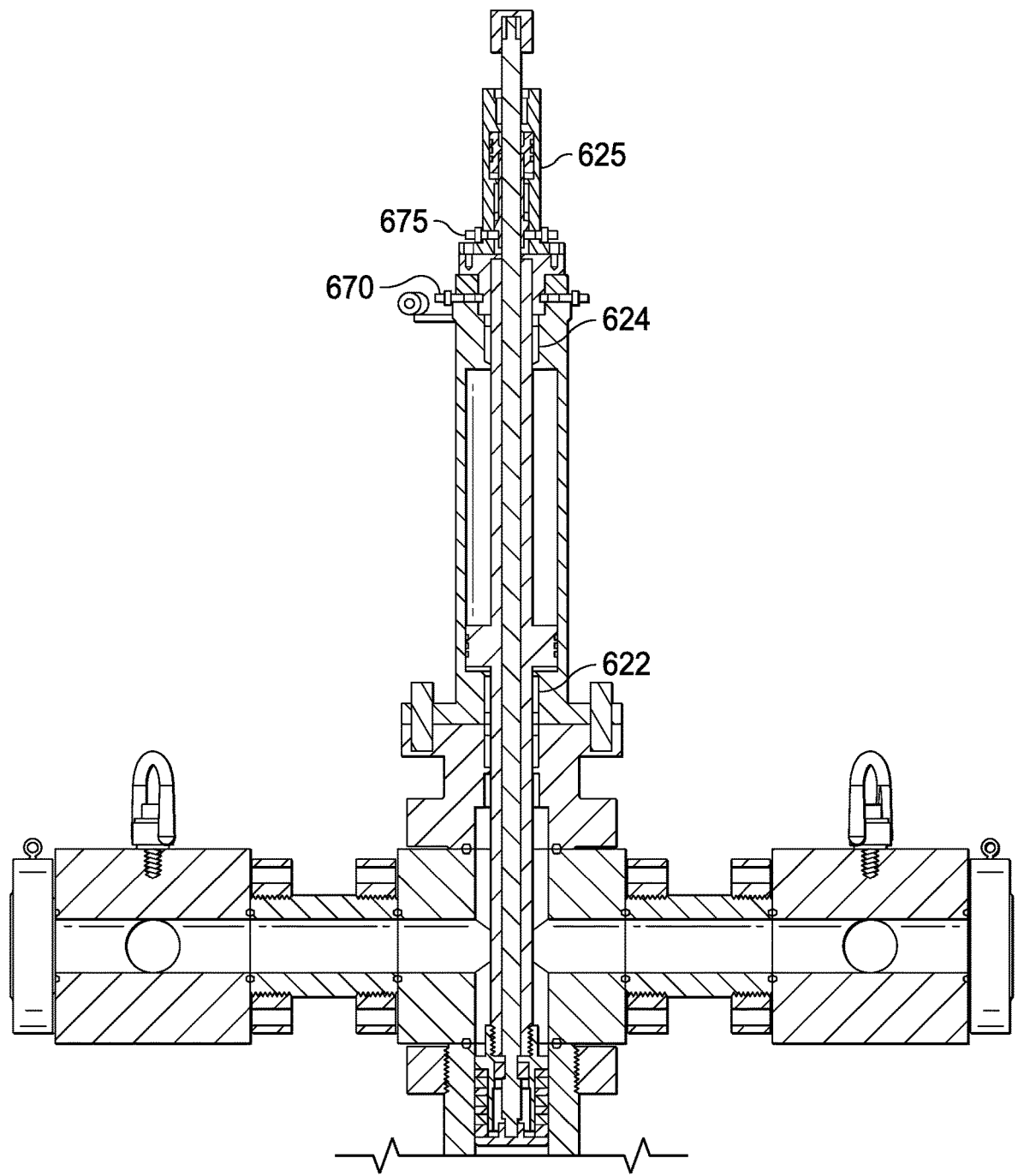
FIG. 9 illustrates an embodiment of a hydraulic setting cylinder with two mandrels.

FIGS. 7-9 show embodiments in which the mandrel system actuated by the hydraulic setting cylinder 620 may be a dual mandrel system. In the dual mandrel system, two concentric mandrels, an inner 645 and an outer 640, are used. The two mandrels 640 and 645 are moved together by the hydraulic setting cylinder 620 to position the mandrel cup tool 260 at the pack off location in either the open or closed position. The inner mandrel 645 can be moved independently of the outer mandrel 640 by a second hydraulic setting tool 625. Once the mandrel cup tool 260 has been positioned at the pack off location, the second hydraulic cylinder 625 is pressurized to move upwards, or away from the mandrel cup tool 260, which causes the inner mandrel 645 to move upward relative to the outer mandrel 640. The inner mandrel 645 is connected to one end of the mandrel cup tool 260 while the outer mandrel 640 is connected to the other. The upward movement of the inner mandrel 645 relative to the outer mandrel 640 causes the mandrel cup tool 260 to be compressed and the seals 265 to be extruded and form a seal at the pack off location.

FIG. 7 shows an embodiment in which the lock mechanism 670 is relatively close to the pack off location where the mandrel cup 260 will be positioned. The stay rods 690 provide access to the lock mechanism 670 and the packing boxes 622 and 624, but also increase the well configuration unit's overall height. The packing box 622 seals between the outer mandrel 640 and the flange 623 to prevent pressurized fluid from leaking out of the well configuration unit. Similarly, the packing box 624 provides a seal between the outer mandrel 640 and the hydraulic cylinder 620 to contain the pressurized fluid within the hydraulic cylinder 620. The stay rods 695 maintain the position of the inner mandrel 645 relative to the outer mandrel 640 and provide access to the packing boxes 626 and 628.

FIG. 8 shows an embodiment in which the lock mechanism 670 is positioned above the first hydraulic cylinder 620. The stay rods 690 and 695 are able to be shortened relative to those shown in FIG. 6, but still allow access to the packing boxes 622 and 624.

FIG. 9 illustrates an embodiment which does not use stay rods. Once a seal has been formed at the mandrel cup tool 260, the relative position of the inner mandrel 645 to the outer mandrel 625 may be fixed by a second lock mechanism 625 so that the seal is maintained. When the mandrel system needs to be moved again, from one position to another, the second lock mechanism is unlocked so that the inner and outer mandrels are able to move relative to each other. The inner and outer mandrels are moved relative to each other such that the sealing element does not form a seal against the spool, and then the mandrels may be moved together to the open or closed position.

Figure 10:
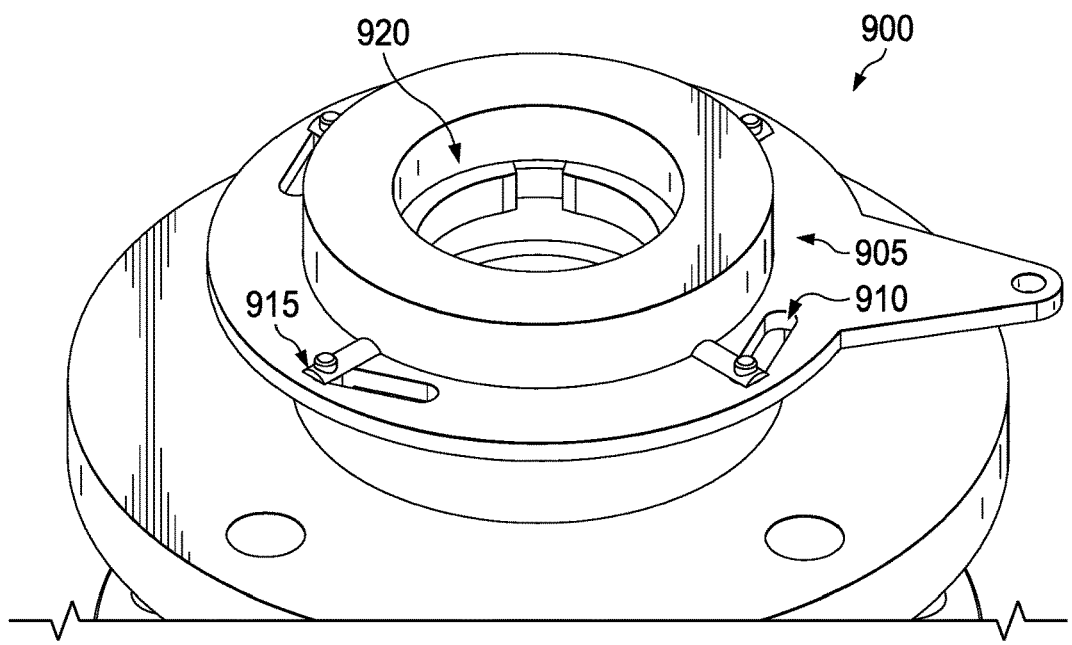
FIG. 10 illustrates an embodiment of a lock mechanism in the unlocked position.
Figure 11:
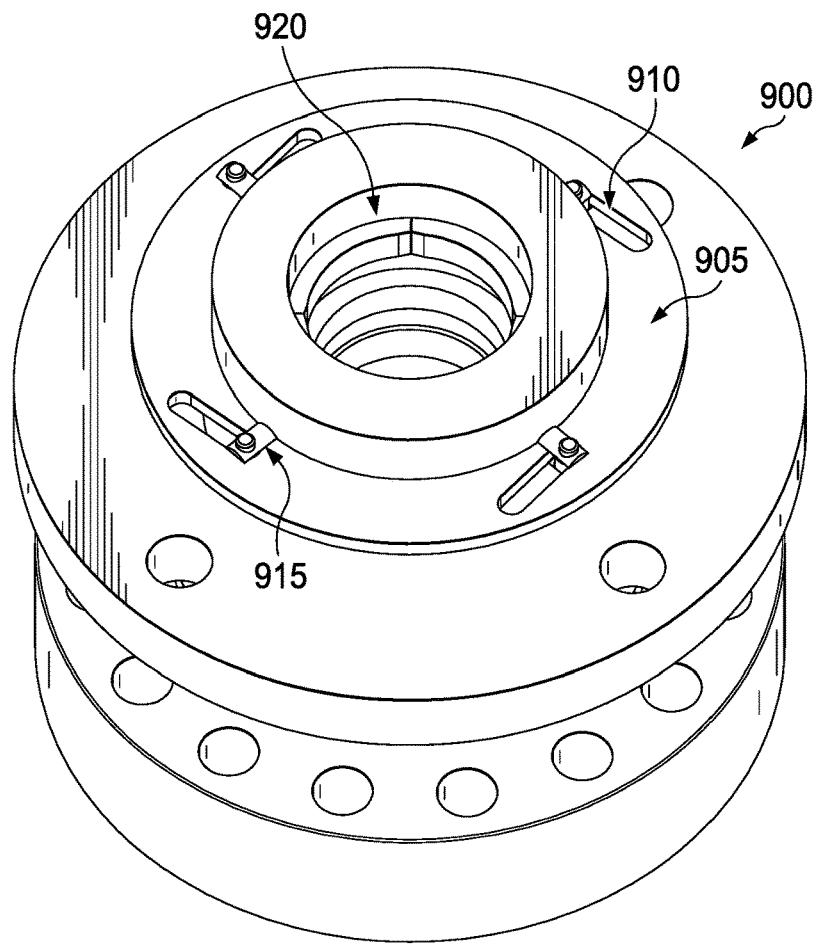
FIG. 11 illustrates a lock mechanism in the locked position.
Figure 12:
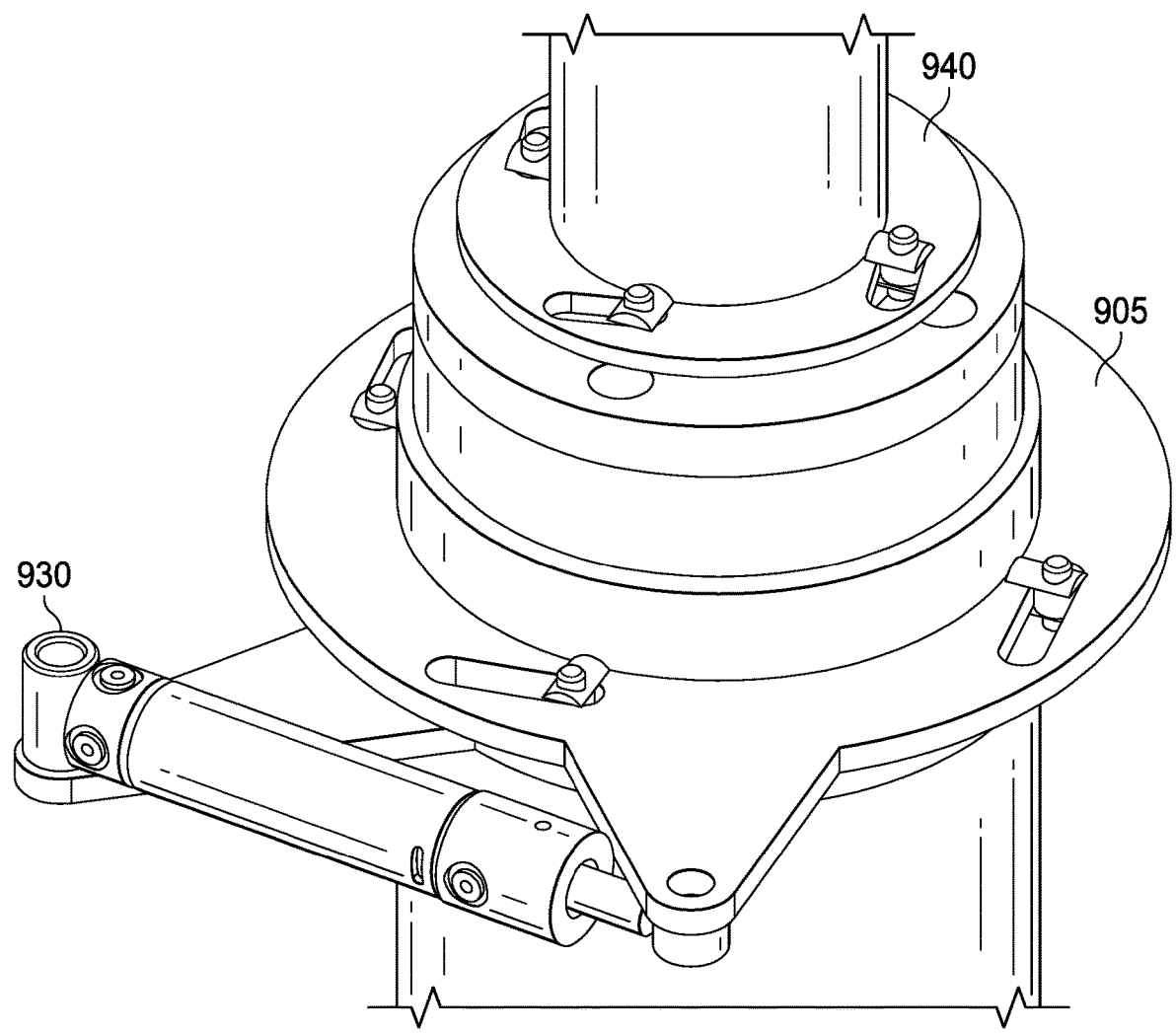
FIG. 12 illustrates a lock mechanism with a linear actuator.

FIGS. 10-12 illustrate an exemplary lock mechanism 900. The lock mechanism 900 may comprise a plate 905 which comprises slots 910. The slots 910 are positioned near the outer circumference of plate 905 and radially extend inward/ outward, such that the radial distance from one end of the slot to the center of the plate 905 is different than the radial distance from the other end of the slot to the center of the plate 905. Pins 915 are engaged in the slots 910. Each pin 915 is connected to a lock segment 920, such that when the pins 915 travel along the slots 910, the change in radial distance for the pins 915 causes the lock segments 920 to correspondingly constrict or enlarge in inner circumference. The lock segments 920 circumscribe a mandrel, which is not shown in FIGS. 10-12. When the lock segments 920 are constricted, they engage the mandrel and lock it in place. The plate 905 can be rotated to cause the lock segments 920 to lock or unlock.

Figure 17:
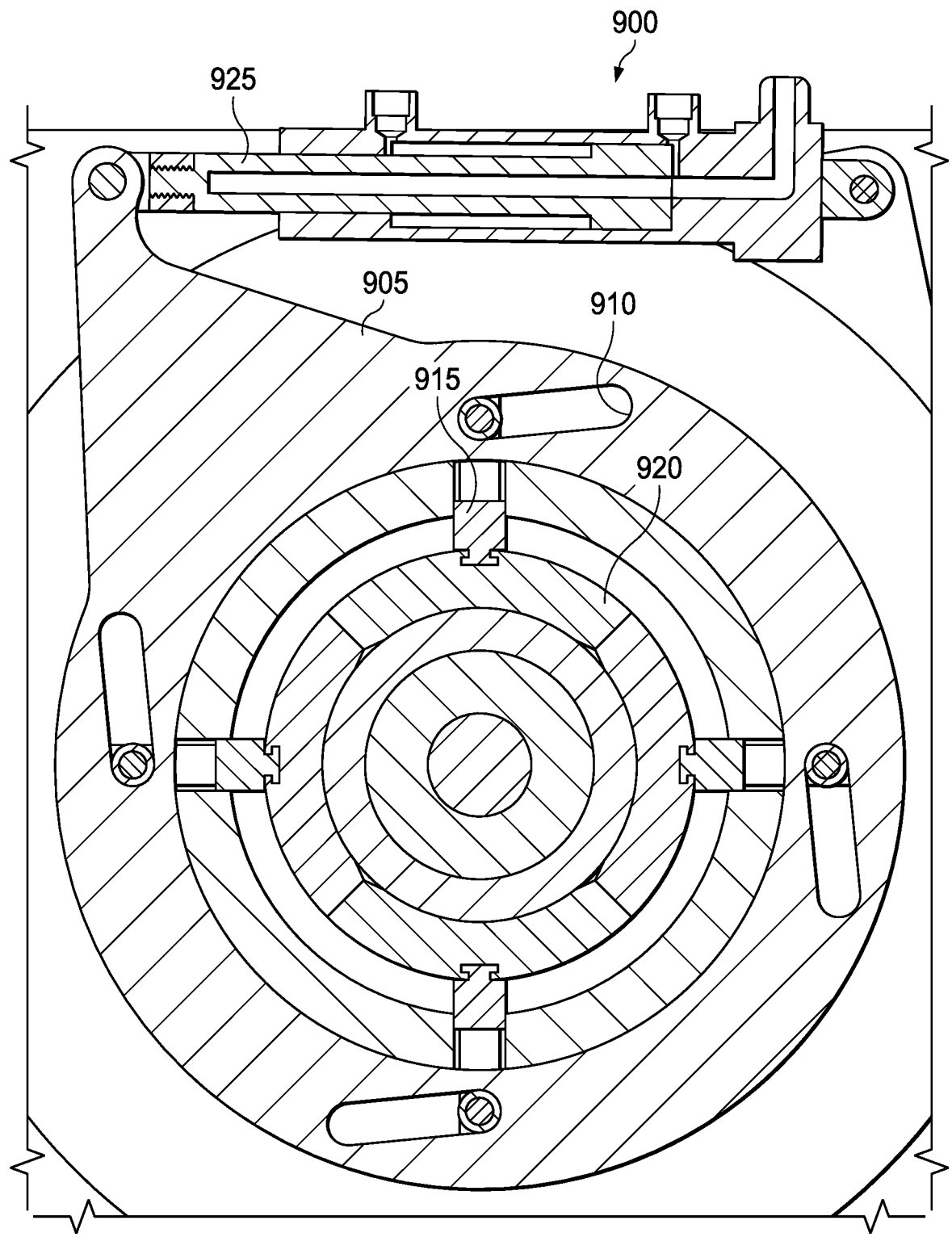
FIG. 17 illustrates a top view of the lock mechanism shown in FIG. 11.

FIG. 10 illustrates the lock mechanism 900 in an unlocked position, FIG. 11 illustrates the lock mechanism 900 in a locked position. FIG. 12 illustrates that a linear actuator may be used to rotate the plate 905 to lock and unlock the lock mechanism. FIG. 12 further illustrates a second lock mechanism 940, which may be similarly locked or unlocked using a linear actuator. FIG. 17 illustrates a top view of lock mechanism 900 in a locked position.

Figure 13:
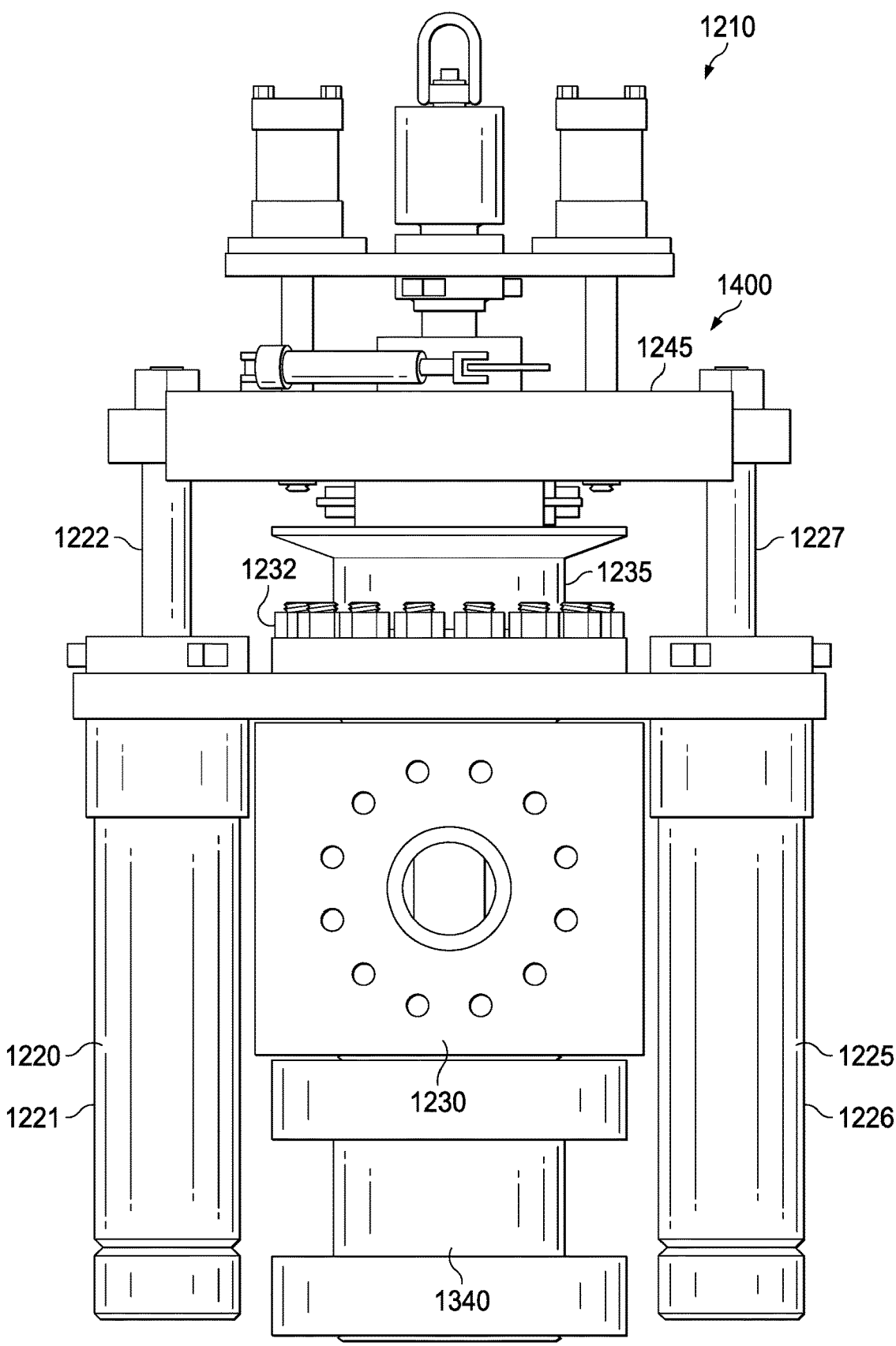
FIG. 13 illustrates an alternative embodiment of an improved zipper manifold.

FIG. 13 illustrates an alternative embodiment of an improved well configuration unit 1210 comprising frac manifold connector 1400 with hydraulic setting cylinders 1220 and 1225. Setting cylinders 1220 and 1225 comprise outer housings 1221 and 1226 respectively, which are connected to flange 1235. Flange 1235 is connected to bridge connector header 1230 via bolts 1232. Bridge connector header 1230 forms a "T" junction with a lower bore, such as lower spool 1340, similar to the above discussion concerning the embodiment shown in FIGS. 2-12.

Figure 14:
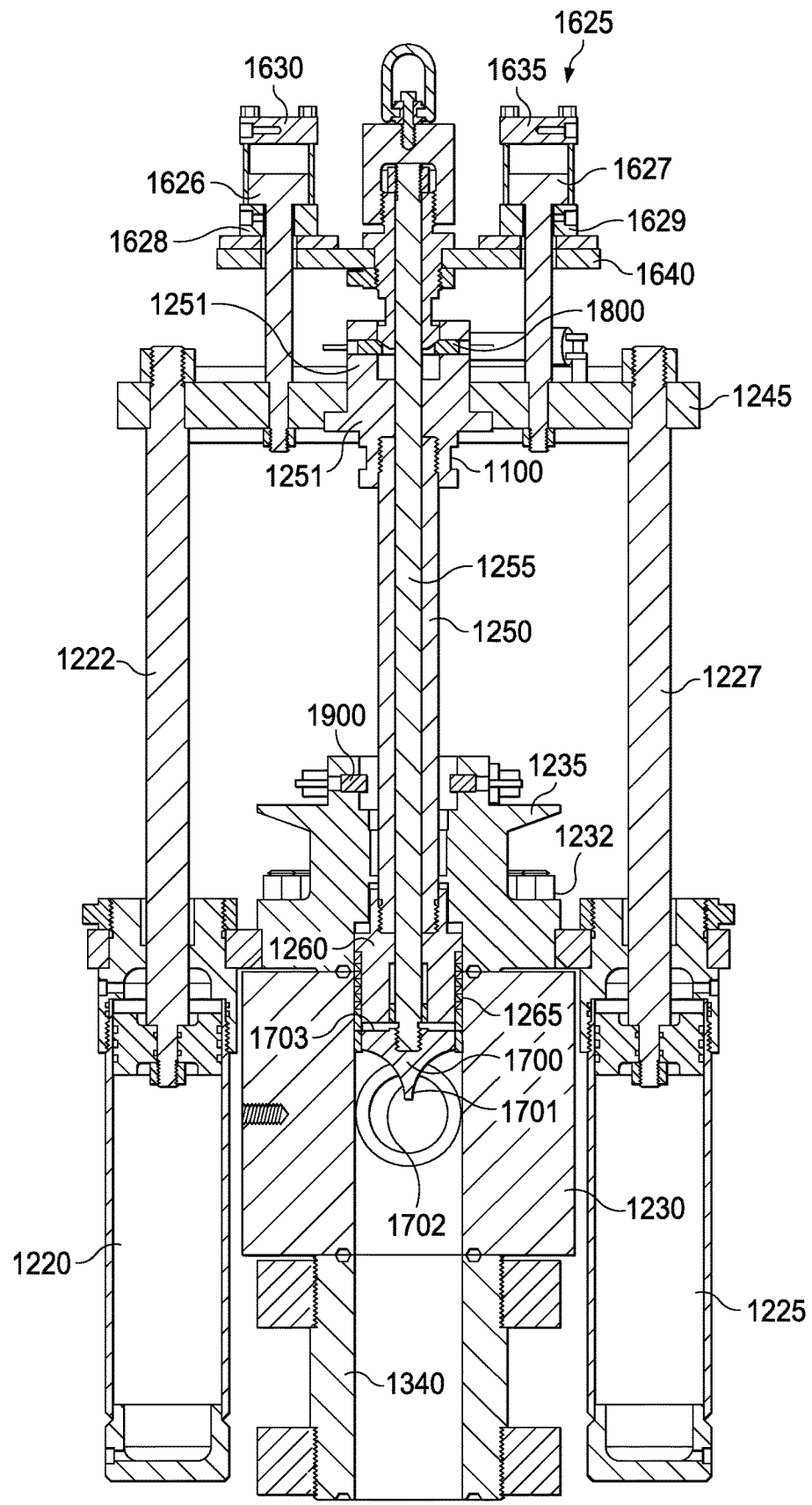
FIG. 14 illustrates the embodiment of FIG. 13 with the mandrel in the open position.

Setting cylinders 1220 and 1225 also comprise rods 1222 and 1227 respectively. Rods 1222 and 1227 each comprise an upper end, each of which is connected to lower plate 1245. As shown in FIG. 14, lower plate 1245 is also connected to mandrel head 1251, which is in turn connected to outer mandrel 1250. Cup tool 1260, comprising gauge ring 1261 and seals 1265, is located at the lower end of outer mandrel 1250.

Similar to the embodiment shown in FIGS. 7-9, frac manifold connector 1400 comprises a dual mandrel system. In the dual mandrel system, two concentric mandrels, an inner 1255 and an outer 1250, are used. Inner mandrel 1255 comprises a lower end which is connected to compression member 1700. Compression member 1700 comprises a generally planar surface 1703 and may also comprise concave lower surfaces 1701 and 1702, which may serve to divert high-pressure flow and protect the integrity of seals 1265. Although not shown in other figures, the lower portion of any cup tool described herein (cup tools 260, 1260, or 2260) may include concave lower surfaces similar to 1701 and 1702, which may divert the flow of high-pressure fluid from frac manifold 104.

Figure 16:
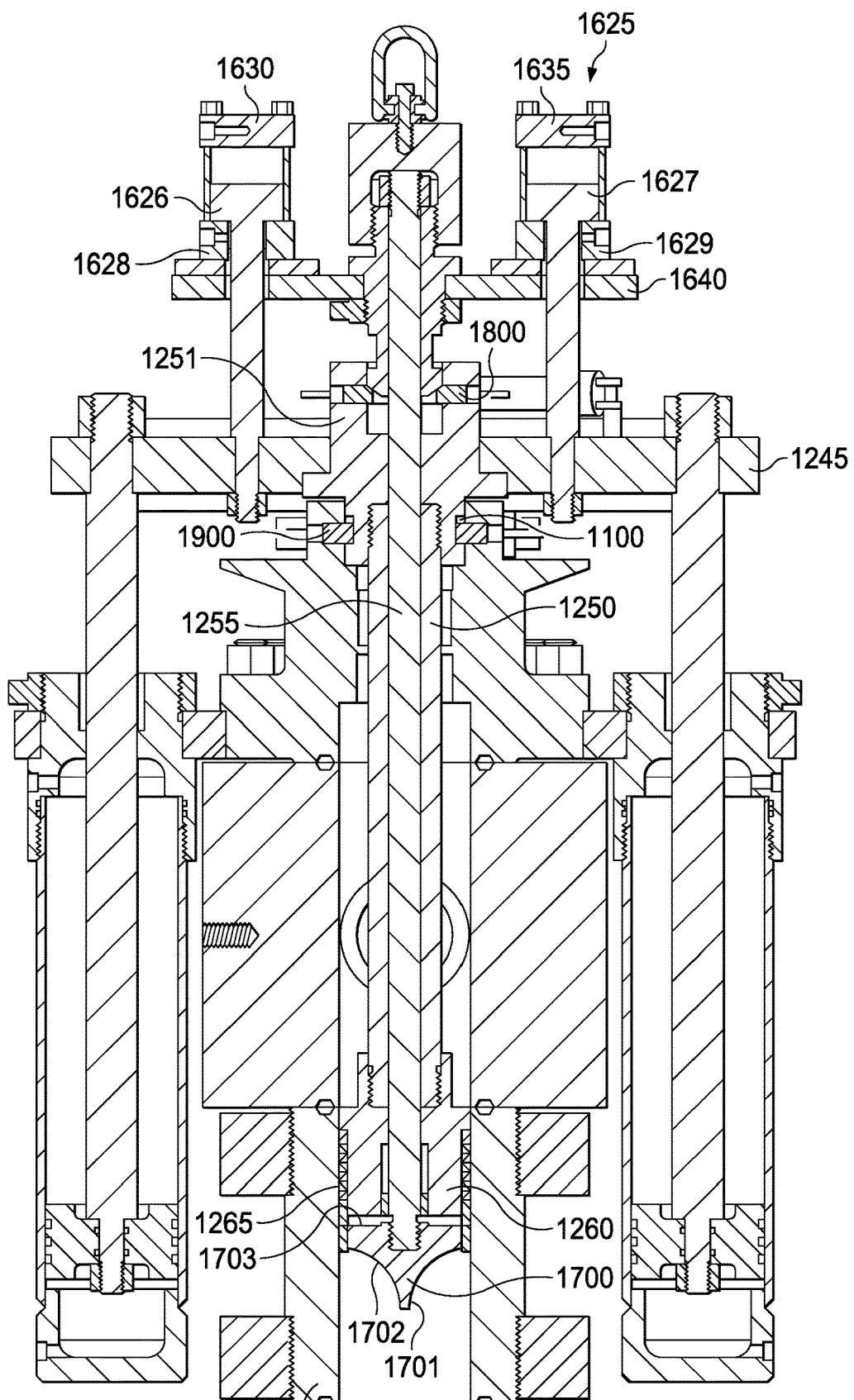
FIG. 16 illustrates the embodiment of FIG. 13 with the mandrel in the closed position, after the seal is set.

As described in further detail below, the two mandrels 1255 and 1250 are moved together by the setting cylinders 1220 and 1225 to position the cup tool 1260 at the pack off location below bridge connector header 1230, as shown in FIG. 16.

The inner mandrel 1255 can be moved independently of the outer mandrel 1250 by a second hydraulic setting tool 1625. Second hydraulic setting tool 1625 comprises hydraulic cylinders 1630 and 1635, which are connected to upper plate 1640. Hydraulic cylinders 1630 and 1635 comprise outer housings 1628 and 1629 respectively, which are connected to upper plate 1640. Hydraulic cylinders 1630 and 1635 also comprise rods 1626 and 1627 respectively. Rods 1626 and 1627 each comprise a lower end, each of which is connected to lower plate 1245.

In operation, frac manifold connector 1400 begins in the position shown in FIG. 14, with cup tool 1260 located above bridge connector header 1230. In this position, fluid is free to flow through bridge connector header 1230. The position of the cup tool is shown in more detail in FIG. 15.

Figure 15:
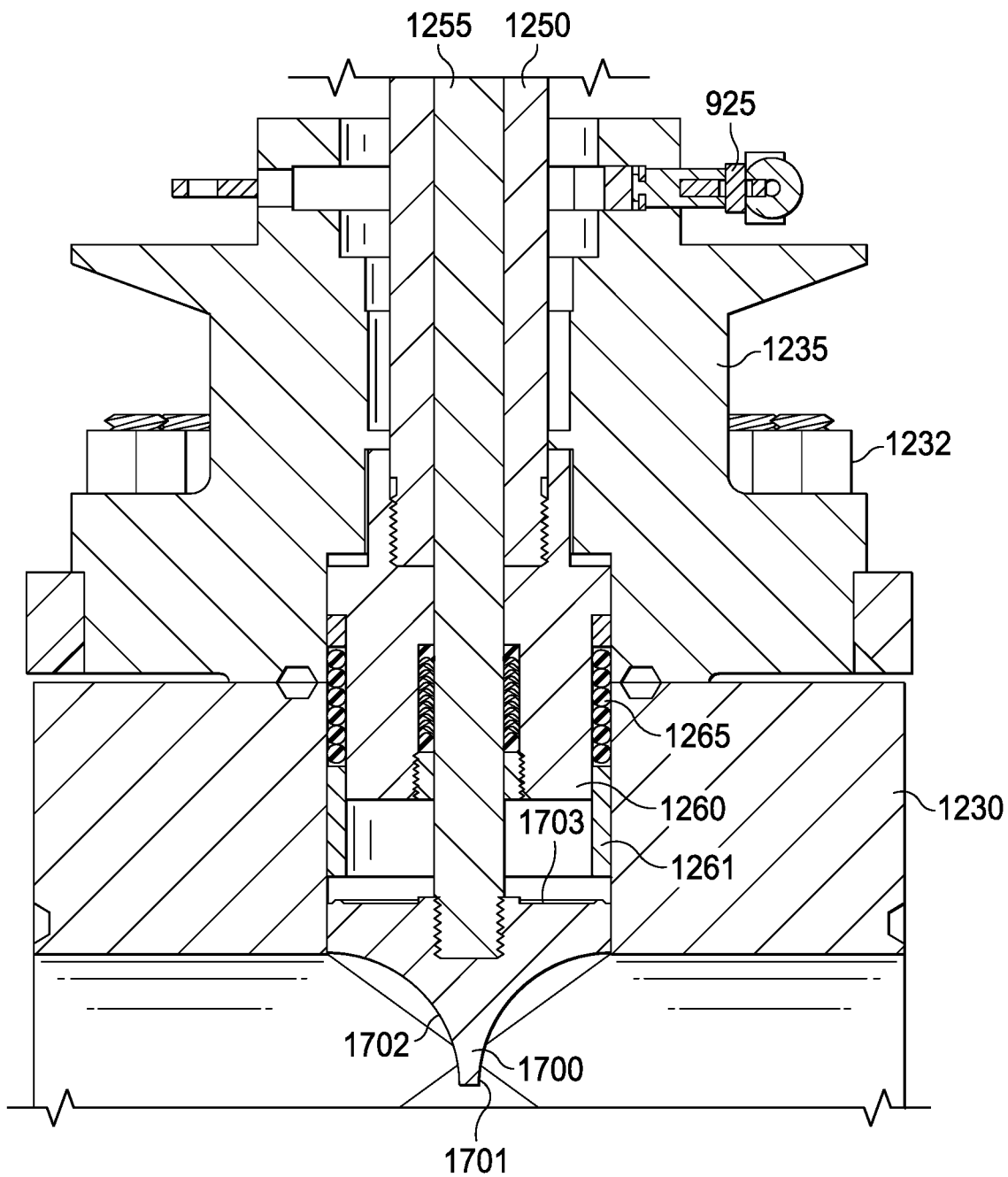
FIG. 15 is an enlarged view of the bottom portion of the mandrel shown in FIG. 14.

When the operator desires to seal bridge connector header 1230, hydraulic fluid is injected into the upper portion of hydraulic setting cylinders 1220 and 1225, thereby forcing rods 1222 and 1227 downward. Due to the connection between rods 1222 and 1227 and lower plate 1245, as well as the connection between lower plate 1245 and mandrel head 1251, the downward movement of rods 1222 and 1227 causes outer mandrel 1250 to move downward through bridge connector 1230 and into lower spool 1340 to the point that cup tool 1260 is located below the "T" junction of bridge connector header 1230 as shown in FIG. 15. In addition, due to the connection between rods 1626 and 1627 and upper plate 1640, inner mandrel 1255 and compression member 1700 also move downward towards lower spool 1340.

Once the cup tool 1260 has been positioned at the pack-off location, and the operator desires to engage seals 1265, hydraulic cylinders 1630 and 1635 are pressurized such that rods 1626 and 1627 move upwards, or away from the cup tool 1260, which causes the inner mandrel 1255 to move upward relative to the outer mandrel 1250. When this happens, upper surface 1703 of compression member 1700 contacts the lower surface of gauge ring 1261 of cup tool 1260. Because the upper surface of gauge ring 1261 contacts seals 1265, continued upward movement of inner mandrel 1255 and compression member 1700 causes gauge ring 1261 to compress seals 1265, with the result that seals 1265 are extruded outward and form a seal within lower spool 1340 and/or the inner surface of bridge connector 1230.

Improved well configuration unit 1210 may also comprise upper lock mechanism 1800 and lower lock mechanism 1900. Upper lock mechanism 1800 and lower lock mechanism 1900 are generally structured consistent with the design discussed above in connection with lock mechanism 900, and shown in FIGS. 10-12 and 17. The linear actuator for upper lock mechanism 1800 and lower lock mechanism 1900 may comprise hydraulic cylinder 925. As will be understood by those of ordinary skill in the art, the linear actuator may also comprise an electronic actuator.

As illustrated in FIG. 16, lower lock mechanism 1900 is locked when cup tool 1260 has been moved into position below bridge connector header 1230. The lock segments of lower lock mechanism 1900 engage with a groove 1100 on the outer surface of the mandrel head 1251. This engagement prevents outer mandrel 1250 from being forced upward by high-pressure fluid within lower spool 1340, and thus maintains the integrity of the seal formed by seals 1265.

Figure 18:
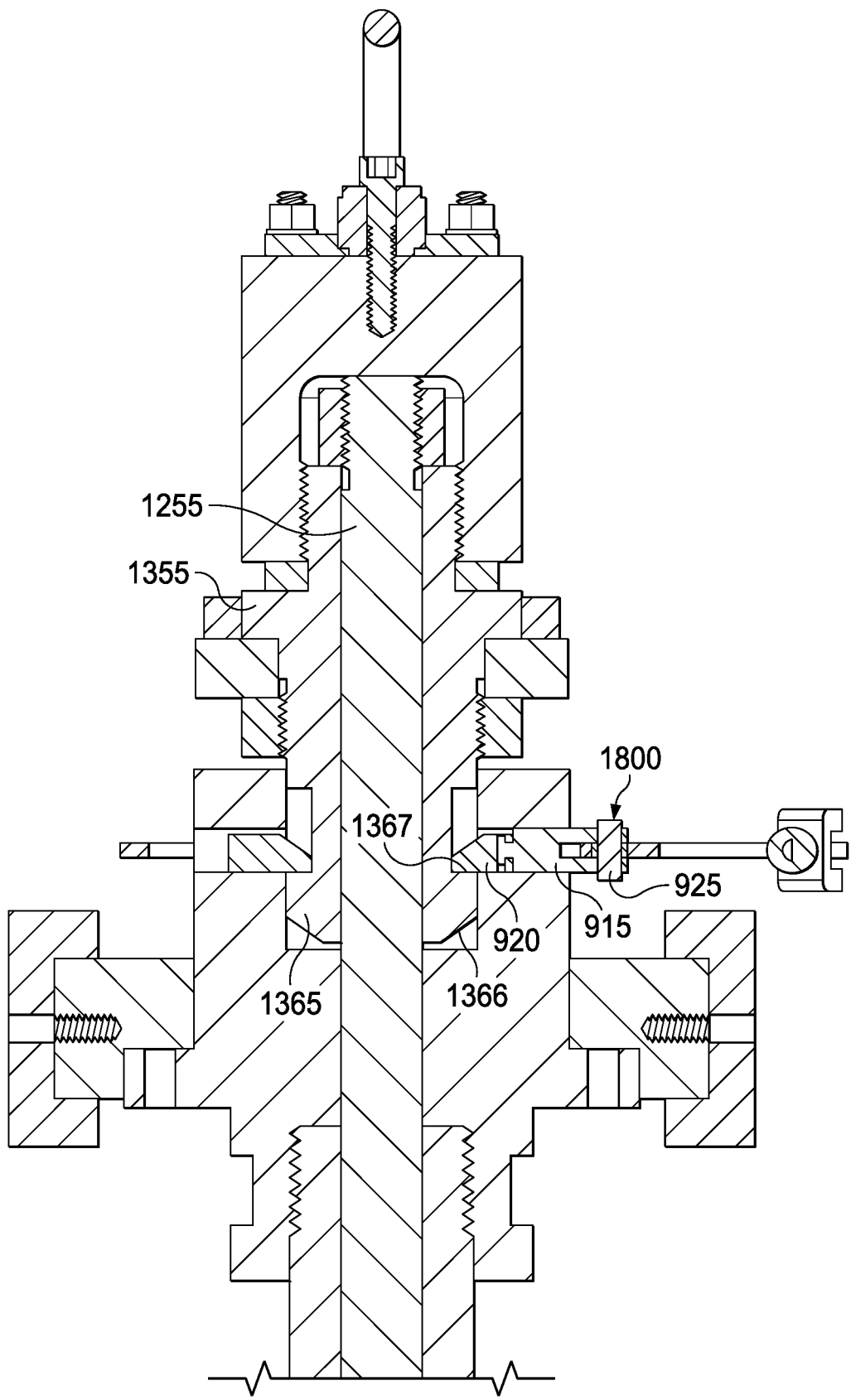
FIG. 18 illustrates the position of an upper locking ring when the mandrel is in the closed position, but prior to the seal being set.
Figure 19:
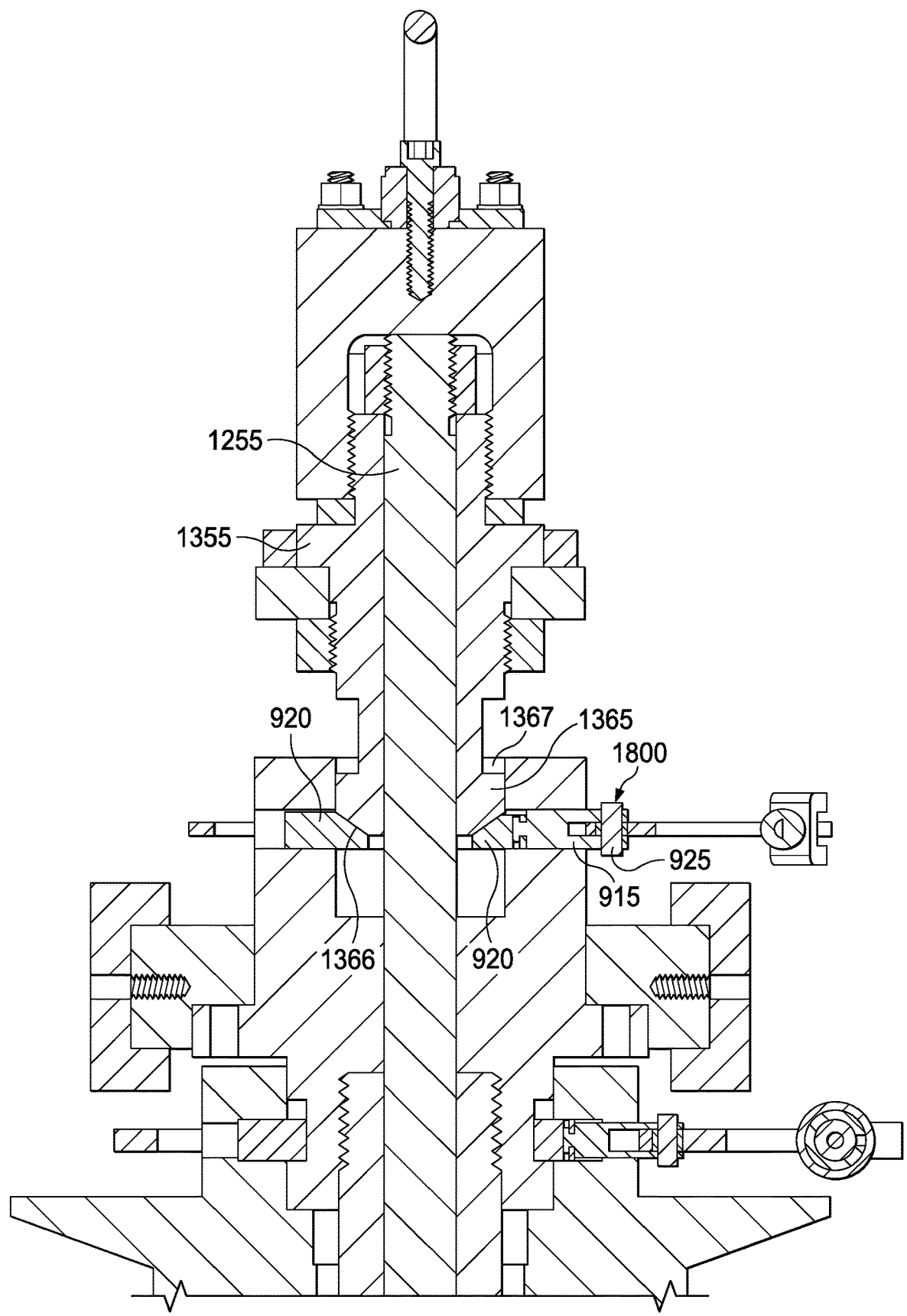
FIG. 19 illustrates the position of an upper locking ring when the mandrel is in the closed position and the seal has been set.

As shown in FIGS. 18 and 19, upper lock mechanism 1800 may be engaged in two distinct positions. FIG. 18 illustrates improved well configuration unit 1210 when cup tool 1260 has been moved into the pack-off location below bridge connector header 1230, but before seals 1265 have been engaged. Inner mandrel 1255 comprises inner mandrel head 1355, which also comprises lower portion 1365. Lower portion 1365 comprises a beveled lower face 1366 and a planar upper face 1367. As shown in FIG. 18, before seals 1265 have been engaged, upper lock mechanism 1800 is locked such that its segments 920 engage with planar upper face 1367 of lower portion 1365 of inner mandrel head 1355.

In this position, seals 1265 cannot be engaged until upper lock mechanism 1800 is disengaged.

FIG. 19 illustrates improved well configuration unit 1210 when cup tool 1260 has been moved into the pack-off location below bridge connector header and after seals 1265 have been engaged by the upward movement of inner mandrel 1255 and compression member 1700. As shown in FIG. 18, upper lock mechanism 1800 is locked such that its segments 920 engage with beveled lower face 1366 of lower portion 1365 of inner mandrel head 1355. In this position, inner mandrel 1255 and compression member 1700 may not be moved downward, thereby disengaging seals 1265, until upper lock mechanism 1800 is disengaged.

Figure 20:
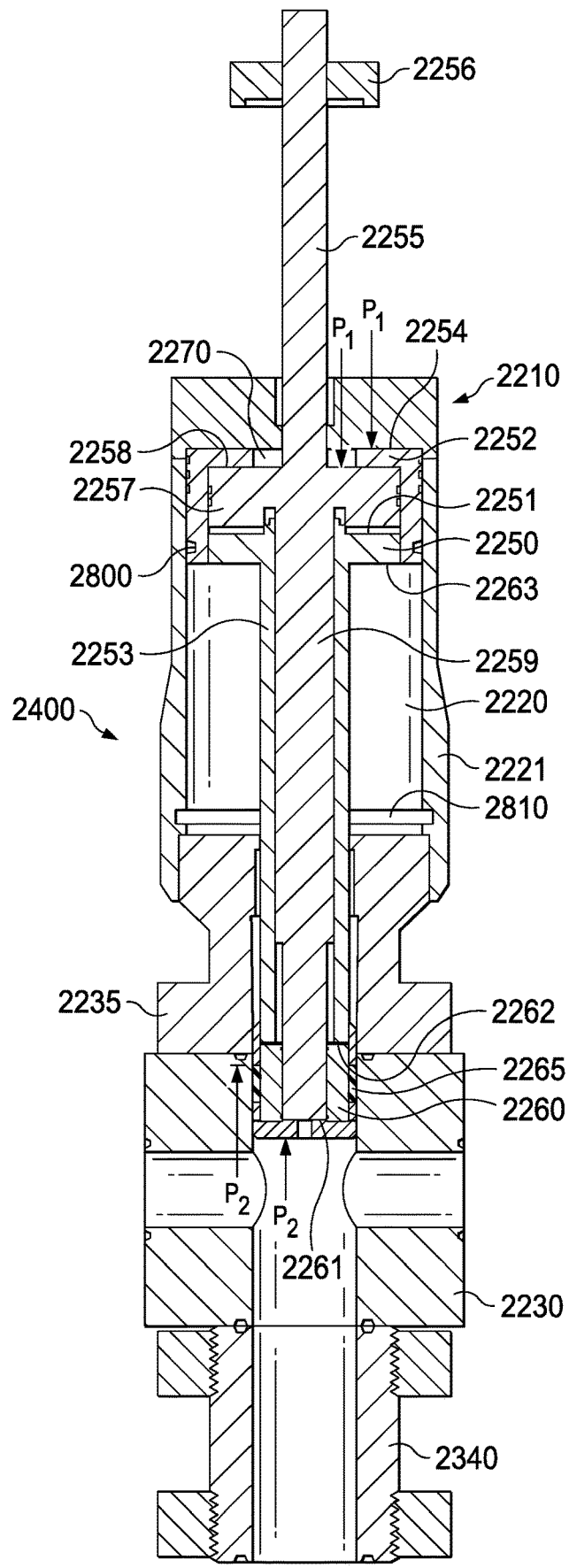
FIG. 20 illustrates an alternative embodiment of an improved zipper manifold before the initial movement of either mandrel.
Figure 21:
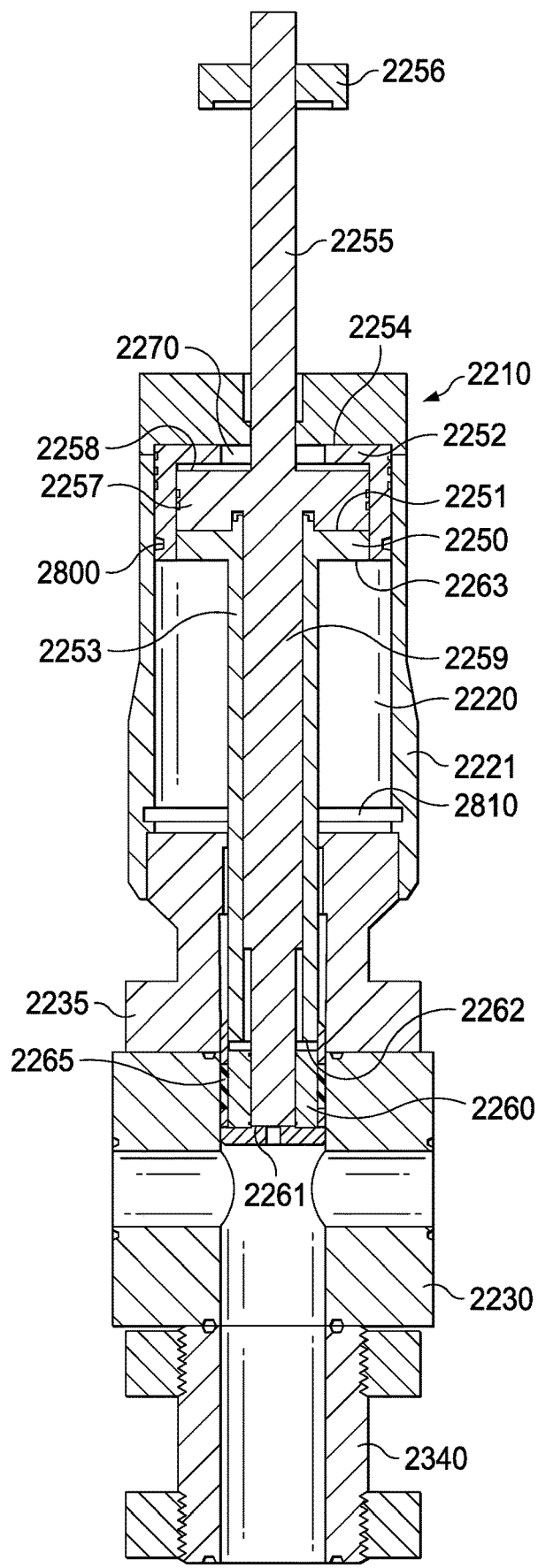
FIG. 21 illustrates the embodiment of FIG. 20 after the initial movement of the inner mandrel but before the initial movement of the outer mandrel.

FIG. 20 illustrates an alternative embodiment of an improved well configuration unit 2210 comprising frac manifold connector 2400 with hydraulic setting cylinder 2220. Setting cylinder 2220 comprises outer housing 2221, which is connected to flange 2235. Flange 2235 is connected to bridge connector header 2230 via bolts (not shown). Bridge connector header 2230 forms a "T" junction with a lower bore, such as lower spool 2340, similar to the above discussion concerning the embodiment shown in FIGS. 2-11.

Similar to embodiments described above, frac manifold connector 2400 comprises a dual mandrel system that includes two concentric mandrels, an inner 2255 and an outer 2250. Inner mandrel 2255 comprises mandrel stop 2256, annular portion 2257 with upper surface 2258, rod 2259, cup tool 2260, and lower surface 2261. Upper surface 2258 has a surface area $A_{i,u}$. Cup tool 2260, comprising seals 2265, is located towards the lower end of inner mandrel 2255. Lower surface 2261 has a surface area $A_{i,1}$.

Outer mandrel 2250 comprises upper housing 2252 and lower housing 2253. Upper housing 2252 comprises upper surface 2254, inner chamber 2251, dogs 2800, and lower surface 2263. Upper surface 2254 has a surface area $A_o$. Lower housing 2253 comprises lower surface 2262, which has a surface area $A_{o,1}$. Annular portion 2257 of inner mandrel 2255 is disposed within chamber 2251. Rod 2259 of inner mandrel 2255 is disposed within lower housing 2253. Lower surface 2262 is adjacent to cup tool 2260, and configured to compress seals 2265 once cup tool 2260 has reached the pack-off position. Compression by lower surface 2262 causes seals 2265 to extrude outward, thus forming a seal with the inner surface of bridge connector 2230 and/or lower spool 2340.

Figure 22:
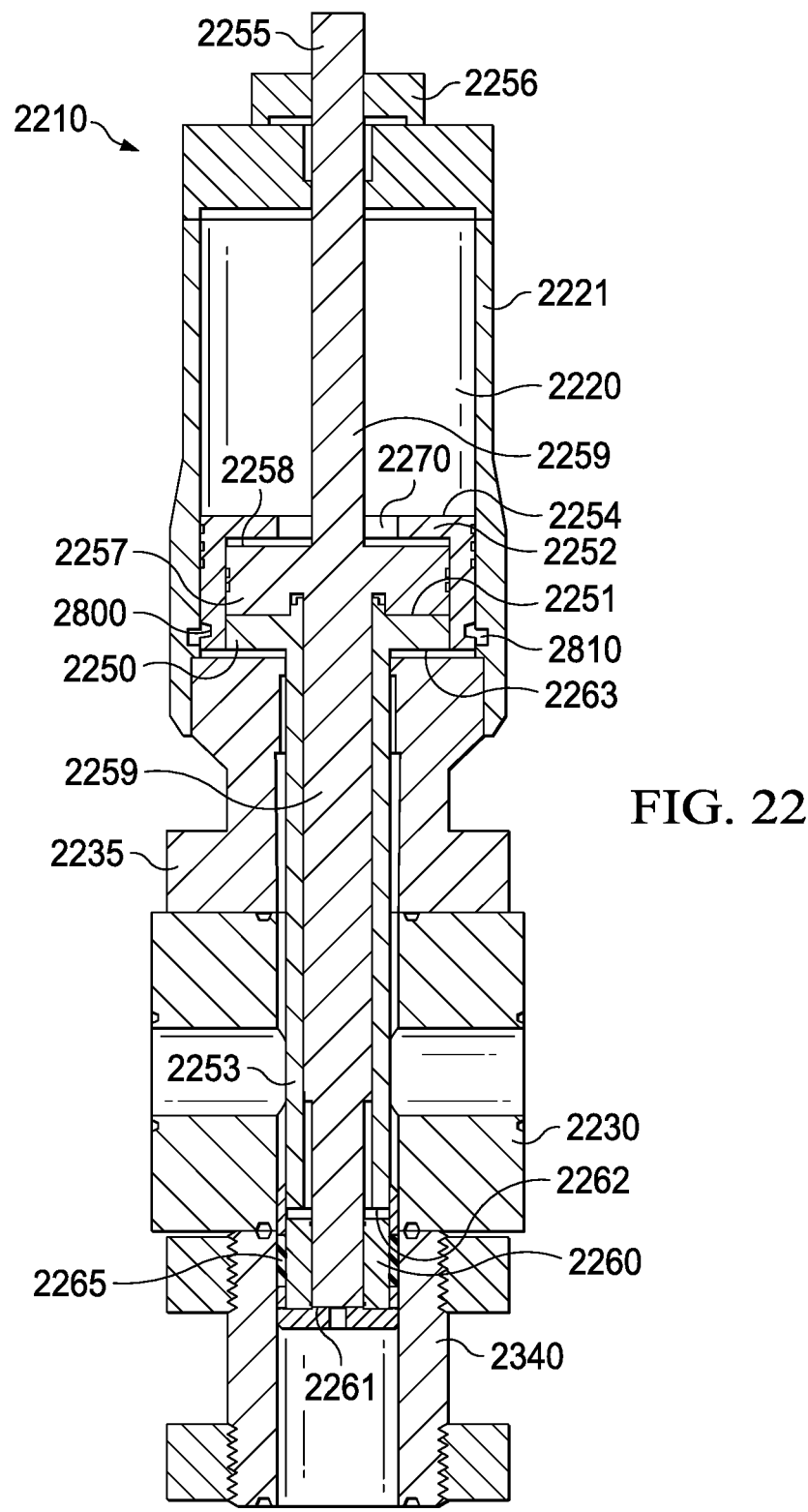
FIG. 22 illustrates the embodiment of FIG. 20 after the seal has been moved to the pack-off position but prior to the seal being set.

As described in further detail below, inner mandrel 2255 is moved independently by the setting cylinder 2220 to position the cup tool 2260 at the pack off location below bridge connector header 2230, as shown in FIG. 22.

In operation, improved well configuration unit 2210 begins in the position shown in FIG. 20, cup tool 2260 located above the "T" junction formed by bridge connector header 1230 and lower spool 2340. In this position, fluid is free to flow through bridge connector header 2230.

When the operator desires to seal bridge connector header 2230, hydraulic fluid is injected into the upper portion of hydraulic setting cylinder 2220. Upper housing 2252 may optionally include orifice 2270 in a central portion of upper surface 2254. Alternatively, upper surface 2254 may not extend radially inward at all, such that the entire upper surface 2258 of inner mandrel 2255 is exposed. Regardless, when hydraulic fluid is injected into the upper portion of hydraulic setting cylinder 2220, it will exert pressure $P_1$ on both upper surface 2258 of inner mandrel 2255 and upper surface 2254 of outer mandrel 2250. Upper surface 2254 of outer mandrel 2250 may optionally comprise passages to facilitate the movement of hydraulic fluid across said surface and towards orifice 2270.

In addition to the downward pressure $P_1$ exerted by hydraulic fluid injected by the operator, upward pressure $P_2$ will generally be exerted on lower surfaces 2261 and 2262 due to the pressure of fluid within bridge connector 2230 and/or lower spool 2340.

It is preferable that inner mandrel 2255 initially move downward in response to hydraulic fluid pressure before the initial downward movement of outer mandrel 2250. If outer mandrel 2250 moves downward before inner mandrel 2255, lower surface 2262 of outer mandrel 2250 will compress seals 2265 before cup tool 2260 has reached the pack-off position. In that event, seals 2265 may prematurely extrude outward and form a seal with the inner surface of bridge connector 2230. This can cause damage to seals 2265 when inner mandrel 2255 continues to move downward to the point that cup tool 2260 has reached a pack-off position.

In general, inner mandrel 2255 will move downward before outer mandrel 2250 if the ratio between the downward force on inner mandrel 2255 ($F_{i,d}$) and the upward force on inner mandrel ($F_{i,u}$) exceeds the ratio between the downward force on outer mandrel ($F_{o,u}$) and the upward force on outer mandrel 1250 ($F_{o,u}$). Expressed differently, the device will work as intended if:

$$F_{i,d}/F_{i,u} > F_{o,d}/F_{o,u}.$$

In the particular design shown in FIGS. 20-23, initial movement of inner mandrel 2255 can be accomplished by controlling surface areas $A_i$, $A_o$, $A_{i,1}$, and $A_{o,1}$. The respective forces on inner mandrel 2255 and outer mandrel 2250 will be determined as follows:

$$F_{i,d}=(P_1)(A_i)$$

$$F_{i,u}=(P_2)(A_{i,1})$$

$$F_{o,d}=(P_1)(A_o)$$

$$F_{o,u}=(P_2)(A_{o,1}).$$

Because pressures $P_1$ and $P_2$ are both exerted on upper and lower surfaces respectively of both inner mandrel 2255 and outer mandrel 2250, inner mandrel 2255 will begin moving downward before outer mandrel 2250 if the following inequality is satisfied:

$$A_i/A_{i,1} > A_o/A_{o,1}.$$

Once inner mandrel 2255 has moved downward to the point that cup tool 2260 is at the pack-off location, mandrel stop 2256 will engage the exterior of outer housing 2221, as shown in FIG. 22, thus preventing further downward movement of inner mandrel 2255. The mandrel stop could take a form other than that depicted in FIG. 22. For example, the mandrel stop could be a radially extending annular shoulder that is rigidly connected to the interior of outer housing 2221 and contacts a corresponding shoulder of the inner mandrel 2255 when cup tool 2260 is at the pack-off location. The mandrel stop could also be one or more axially extending rods or shafts rigidly connected to the inner mandrel 2255 and configured to contact any portion of the interior or exterior of outer housing 2221 (or any other portion of well configuration unit 2210) and/or rigidly connected to the interior or exterior of outer housing 2221 and configured to contact any portion of inner mandrel 2255. Essentially any structure that prevents further downward movement of inner mandrel 2255 once cup tool 2260 is at the pack-off position can serve as the mandrel stop.

At that point, hydraulic pressure $P_1$ will continue to act upon upper surface 2254 of outer mandrel 2250. That continued downward pressure will cause outer mandrel 2250 to continue to move downward, such that lower surface 2262 engages with and compresses seals 2265. As explained above, this compression will cause seals 2265 to extrude outward, thus forming a seal with the inner surface of bridge connector 2230 and/or lower spool 2340.

Figure 23:
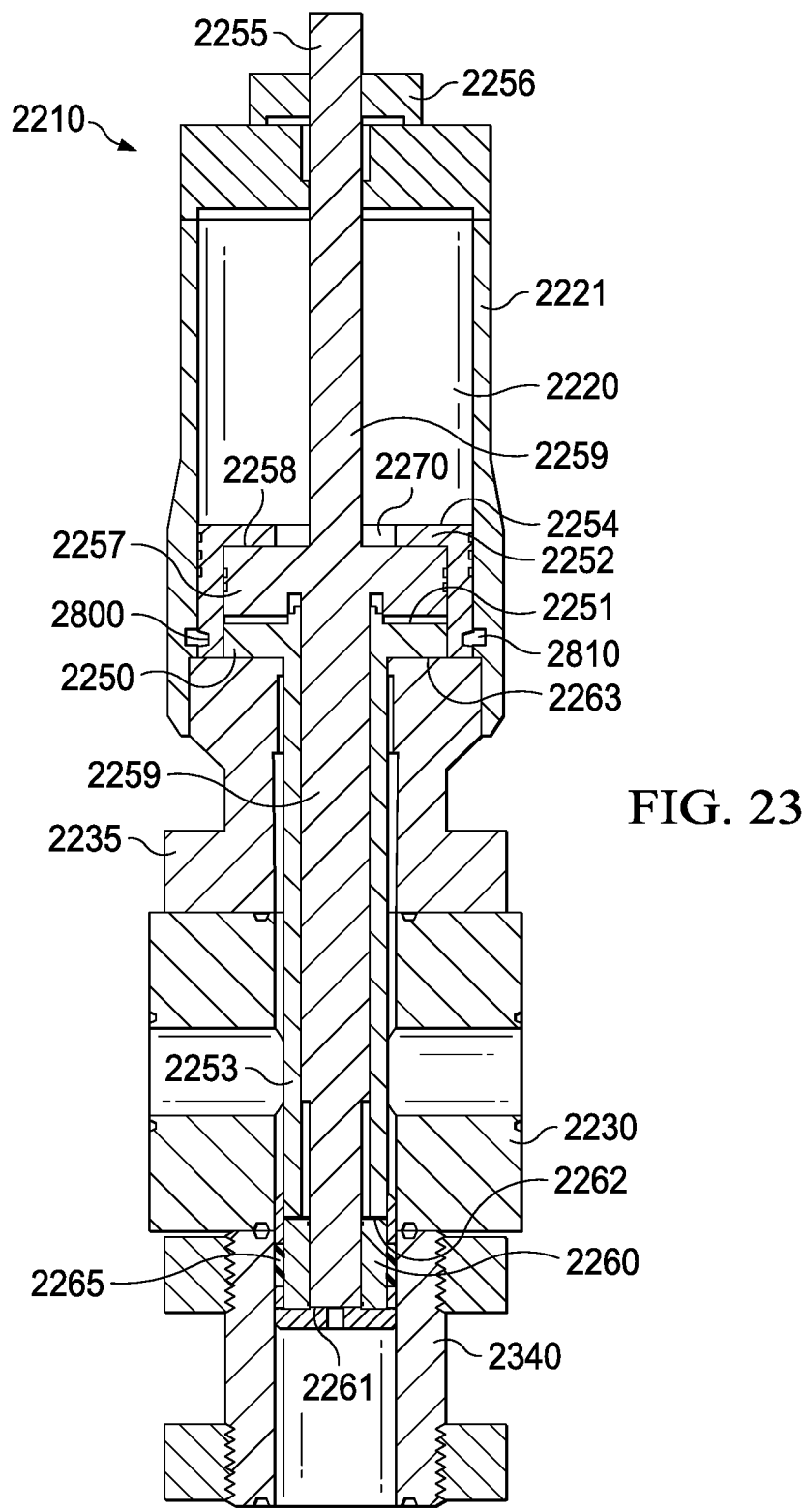
FIG. 23 illustrates the embodiment of FIG. 20 after the seal has been set at the pack-off position.
Figure 24:
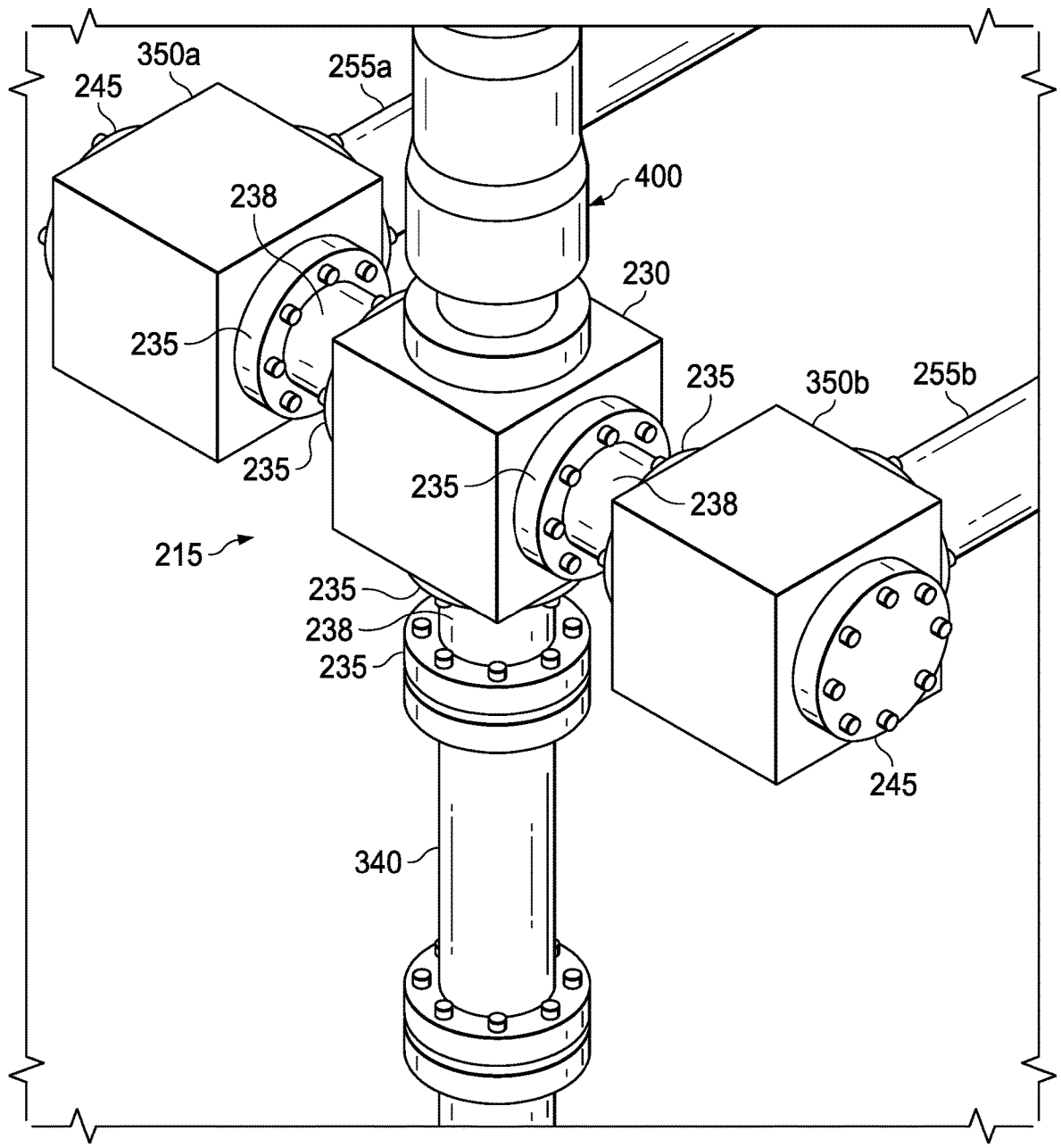
FIG. 24 illustrates the bridge connector header used in conjunction with one embodiment of the improved dual spool connection shown in FIG. 2.

In addition, as shown in FIG. 23, dogs 2800 on the outer surface of upper housing 2252 of outer mandrel 2255 will engage with annular groove 2810 formed on an inner surface of outer housing 2221. This engagement between dogs 2800 and groove 2810 will serve to lock both inner mandrel 2255 and upper mandrel 2250 in position, regardless of fluctuations in the upward pressure $P_2$. One of ordinary skill in the art will appreciate that dogs 2800 are one way of locking the mandrels in position, and that there could be numerous other potential solutions, including locking pins, a hydraulic ram, and others.

To disengage improved well configuration unit 2210, dogs 2800 are disengaged and hydraulic fluid is injected into the lower portion of hydraulic setting cylinder 2220. The hydraulic fluid will exert pressure only on lower surface 2263 of outer housing 2252, thus causing outer mandrel 2250 to move upward and unset the seal formed between seals 2265 and the inner surface of bridge connector 2230 and/or lower spool 2340. Both outer mandrel 2250 and inner mandrel will then continue to move upward within hydraulic setting cylinder 2220 until they reach the initial position shown in FIG. 20.

Although the alternative embodiment shown in FIGS. 20-23 is described in terms of upward and downward forces acting on lower and upper surfaces respectively, one of ordinary skill in the art will appreciate that it is not necessary for the operation of the present invention that the forces act on the upper-most or lower-most surfaces of the inner or outer mandrels.

Details of Bridge Connector

As shown in FIG. 2, bridge connector 500 comprises short spools 238 that connect to either end of horizontal throughbore 225 in bridge connector header 230. In particular, as shown in FIG. 3, short spools 238 connect to side openings 230*c* and 230*d* in bridge connector header 230 via threaded flanges 235.

Threaded flanges 235, which are able to be rotated, are lined up with a corresponding flange or bolt holes during install. The threaded flanges 235 engage threads on the outer surface of the short spools 238, but the external threads include excess threading to allow for additional rotation of the threaded flange 235 to allow it to orient to the desired position. For example, the threaded flange 235 at the bottom of the T is aligned with a corresponding flange on the well configuration unit 210, and bolts are used to secure the flanges together. Studded blocks 350*a* and 350*b* are similarly joined to each of the right and left sides of the T-junction of the bridge connector header 230 via a short spool 238 and threaded flanges 235. Blind flange 245 may be connected to the side of studded blocks 350*a* and 350*b* that is opposite threaded flange 235.

The threaded flanges 235 allow the T-junction of the bridge connector header 230 and associated parts to be oriented into a desired configuration before final assembly of the bridge connector header 230. The threaded flange 235 at the bottom allows the bridge connector header 230 to be rotated about the central axis of the of the well configuration unit 210 (indicated in FIG. 2 as the y-axis), which may also be referred to as azimuthal rotation. Azimuthal rotation about the y-axis allows the entire T-junction, along with both bridge spools 255*a* and 255*b*, to be laterally adjusted in order to accommodate a potential horizontal misalignment between bridge connection header 230 and frac tree header 270.

The threaded flanges 235 on the right and left sides of the T-junction allow bridge spools 255*a* and 255*b* to be rotated about the central axis running horizontally through the T-junction (indicated in FIG. 2 as the z-axis), which may also be referred to as vertical rotation. Vertical rotation about the z-axis allows the distal end of bridge spools 255*a* and 255*b* to be adjusted up or down to accommodate a potential vertical misalignment between bridge connection header 230 and frac tree header 270.

Internally, the T-junction splits the supply fluid flow to the two studded blocks 350*a* and 350*b*, which are elbow shaped to route the flows to the bridge spools 255*a* and 255*b*. The frac fluid travels through the bridge spools 255*a* and 255*b* to the studded blocks 350*c* and 350*d* on the frac tree side, and the two flows are rejoined at the frac tree header 270 of the frac tree 200. Significantly, when the two flow streams enter the frac tree header 270 of the frac tree 200, they enter from opposite directions. As a result, the velocity vectors of both streams will, to some degree, cancel each other out. This cancellation effect results in a lower velocity of the combined flow stream within frac tree 200, as compared to the velocity that would result from the use of a single spool connector.

In simulations performed by the applicant, the configuration shown in FIG. 2, with each bridge spool having a 5-inch inner diameter and an overall flow rate of 100 barrels per minute, the flow velocity in the upper portion of frac tree 200, immediately below T-junction 290, was in the range of 32-38 feet per second.

In a separate simulation, bridge spools 255*a* and 255*b* were replaced with a single bridge spool running in a straight line between bridge connector 230 and frac tree header 270. The single bridge spool was simulated with an inner diameter of 7 inches, such that it had the same cross-sectional area as the combination of bridge spools 255*a* and 255*b* (49 in$^2$ vs 50 in$^2$). At the same simulated rate of 100 barrels of fluid flow per minute, the flow velocities seen at the same point within frac tree 200 were significantly higher than the dual-spool configuration, generally exceeding 38 feet per second and in certain areas exceeding 45 feet per second.

The dual-spool configuration shown in FIG. 2 should also result in lower turbulence of the combined flow stream within frac tree 200. The lower velocity and lower turbulence should reduce the risk of erosion within frac tree 200, as compared to a flow stream within a single spool connector.

Figure 25A:
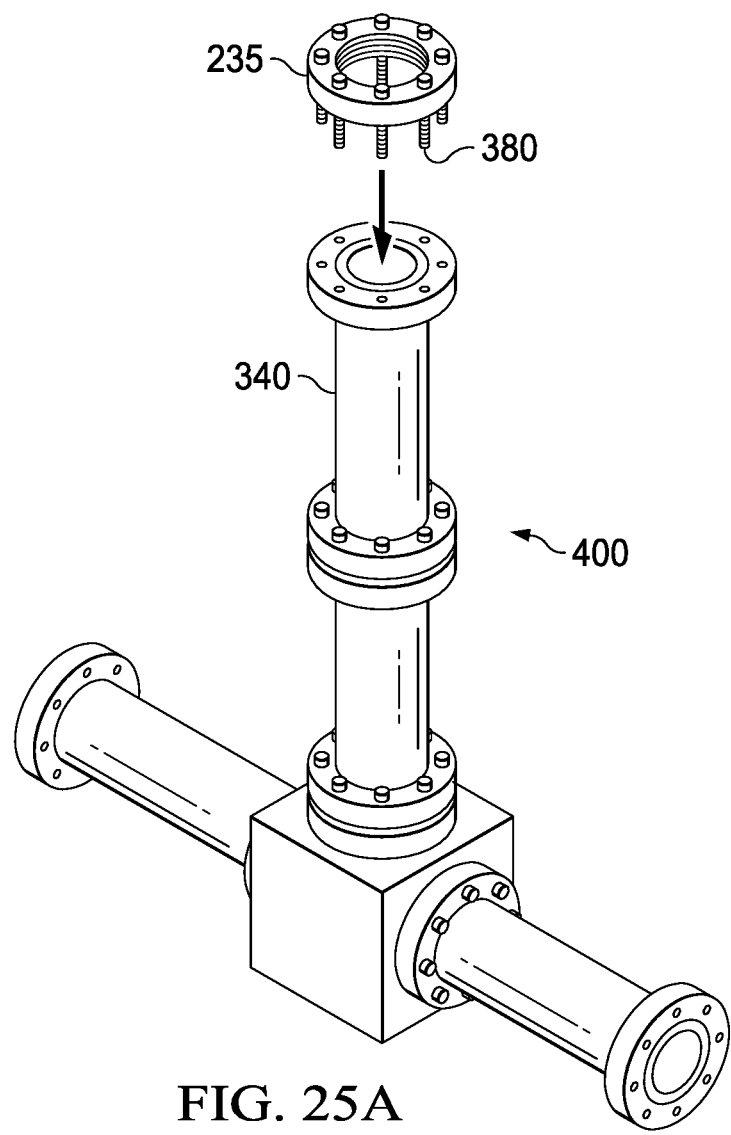
FIGS. 25A-25E illustrate one method of installing a short spool and threaded flange on the lower side of a T-junction.
Figure 25B:
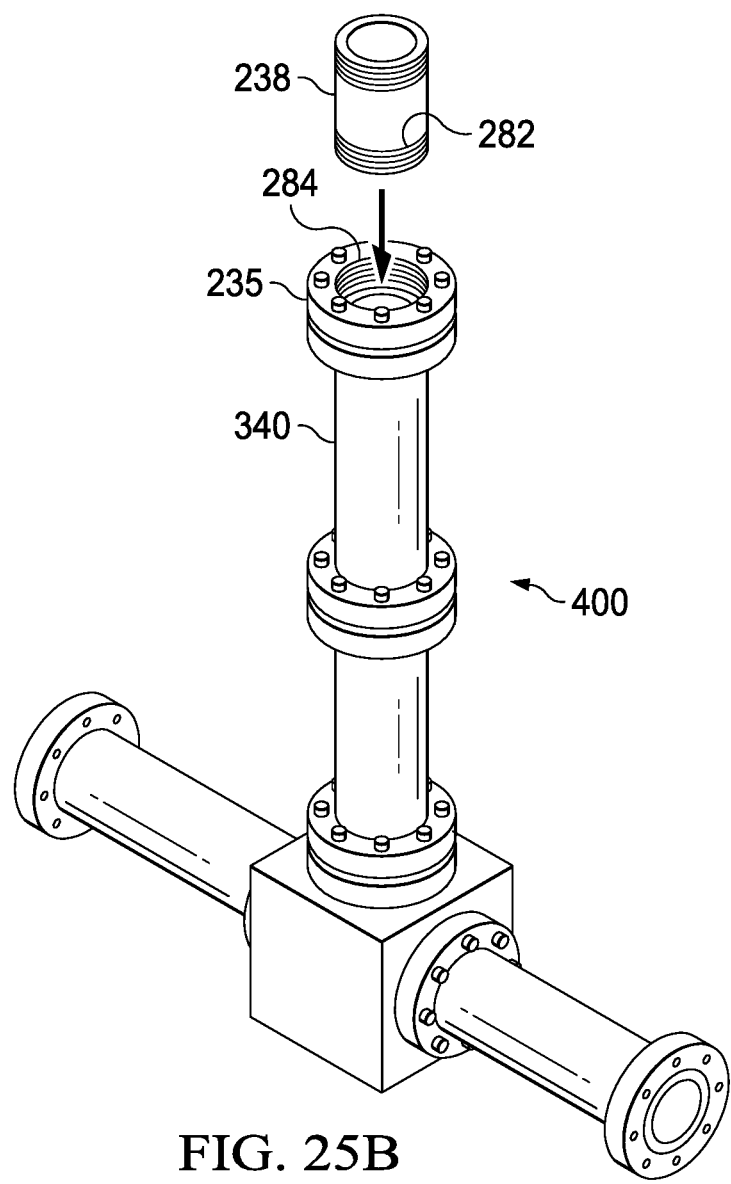
Figure 25C:
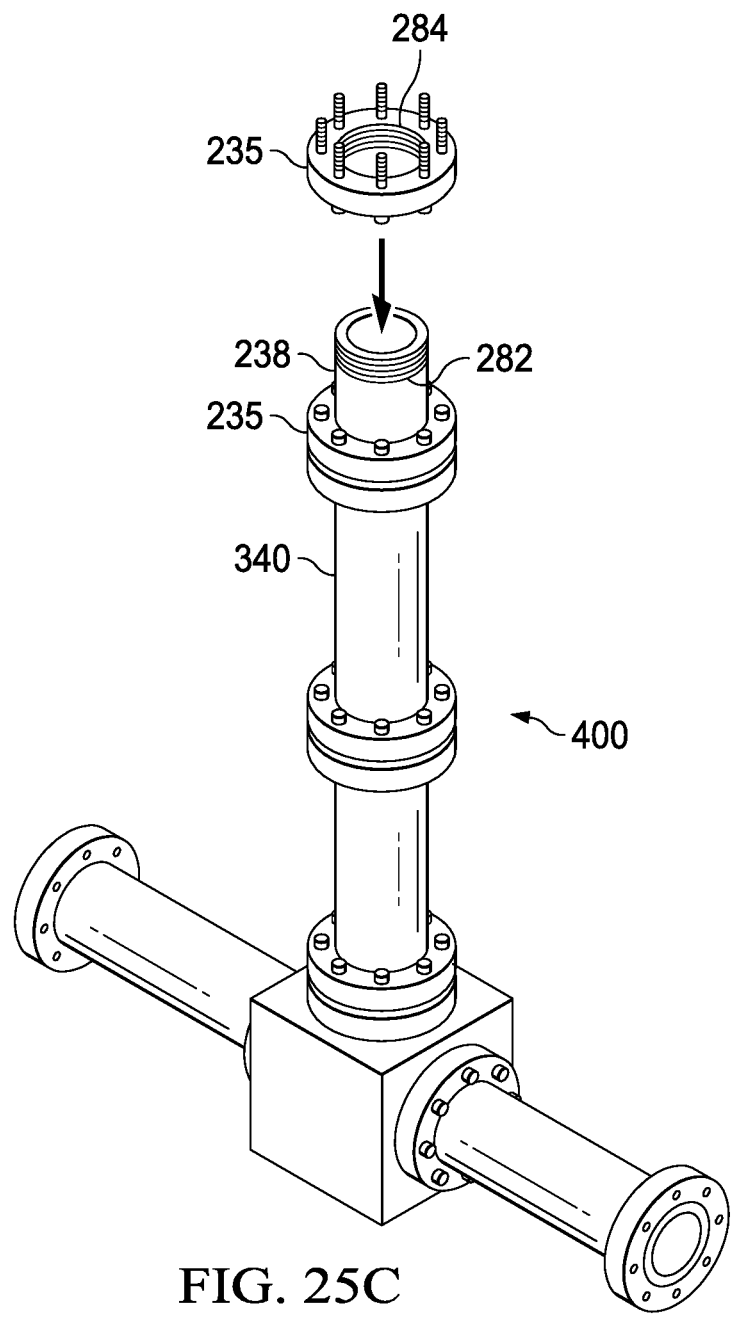
Figure 25D:
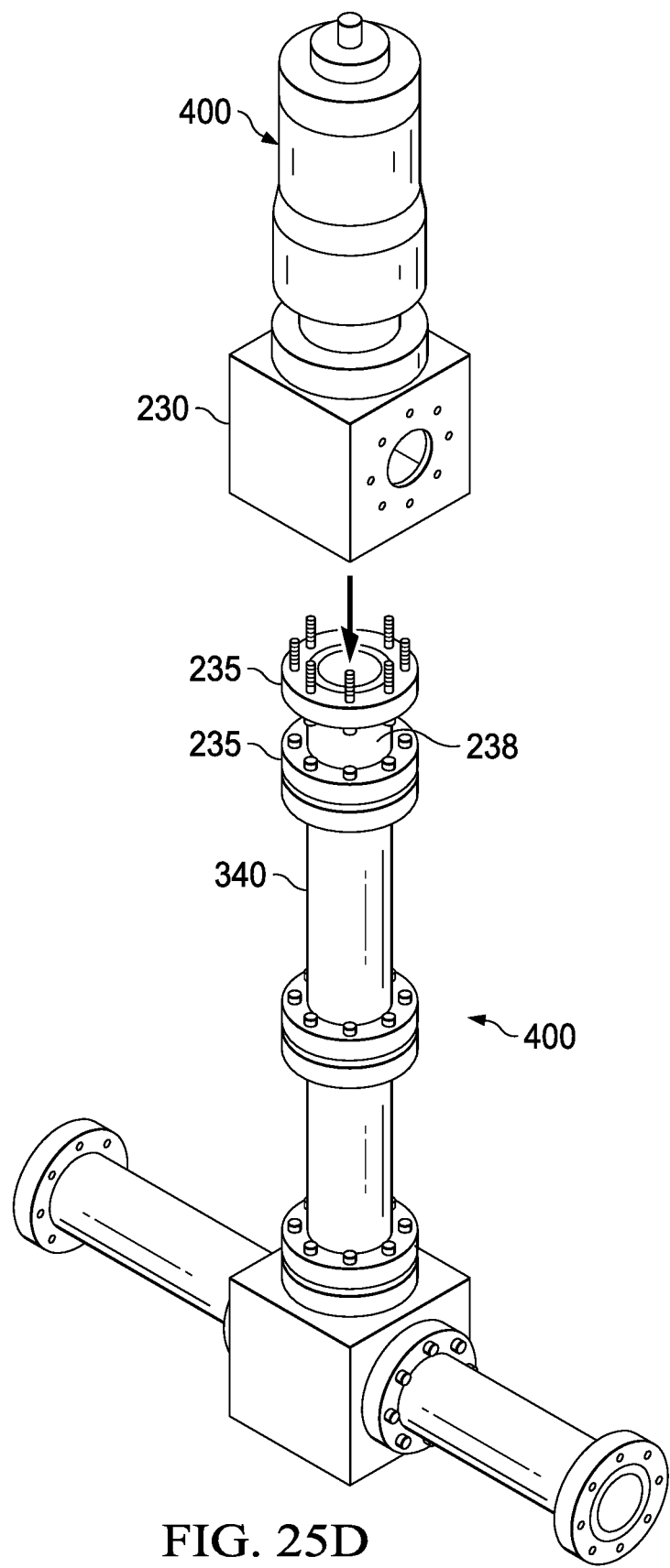
Figure 25E:
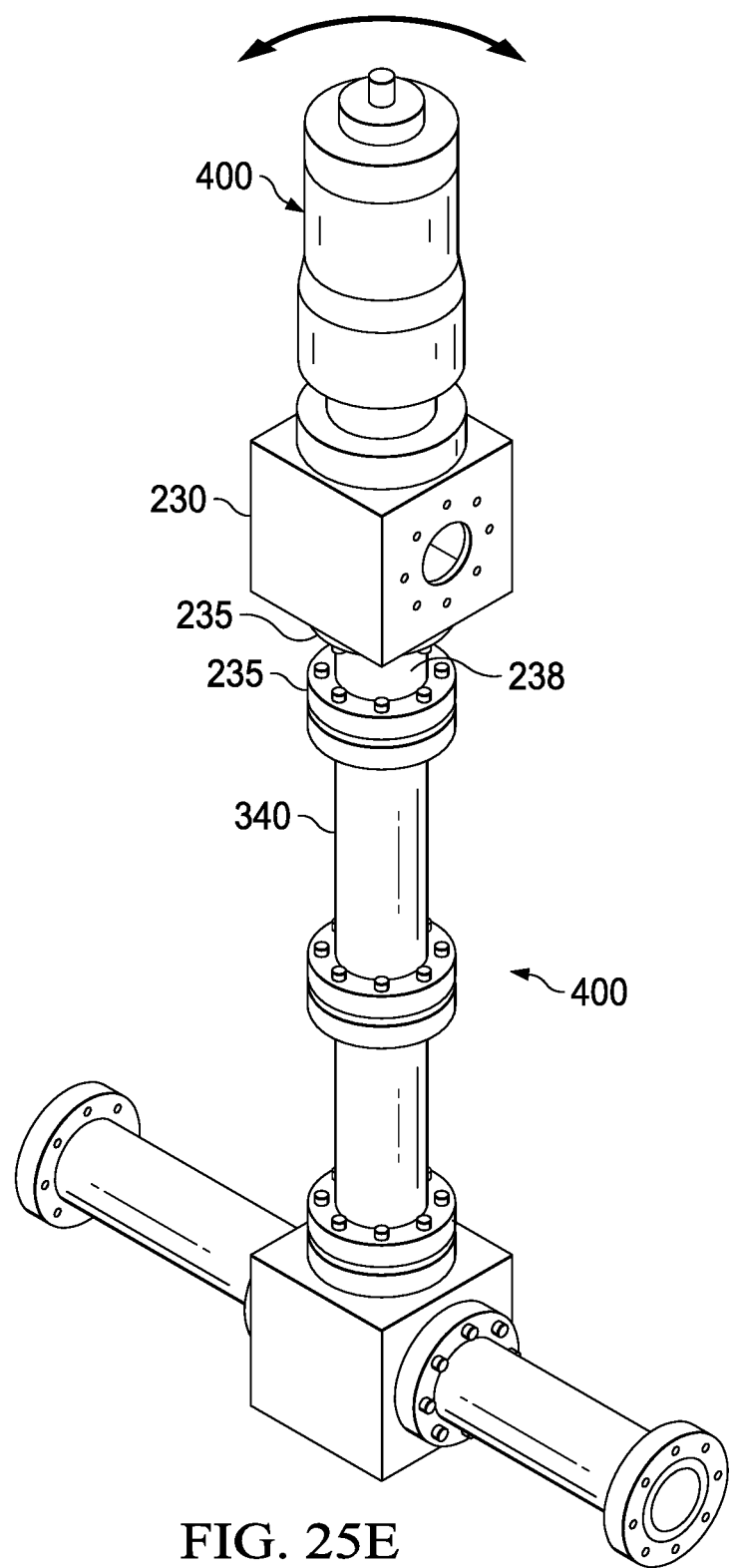

Installation of the improved connector bridge can be performed in several different ways. In one method, the first step in the installation process, as shown in FIG. 25A, is to securely attach lower threaded flange 235 to the top end of lower spool 340, using bolts 380. Next, as shown in FIG. 25B, short spool 238 is attached to threaded flange 235 by rotating short spool 238 until the threaded portion 282 is fully engaged with the complementary threaded portion 284 of threaded flange 235. Next, as shown in FIG. 25C, upper threaded flange 235 is attached to short spool 238 by rotating upper threaded flange 235 until the threaded portion 284 is engaged with the complementary threaded portion 282 of short spool 238. Next, as shown in FIG. 25D, upper threaded flange 235 is attached to bridge connector header 230 using bolts 380. At this point, if necessary, bridge connector header 230 is rotated azimuthally about the y-axis, such that it aligns correctly with the frac tree to which the bridge spools are intended to connect. Such azimuthal rotation is accomplished by the threaded connection between upper threaded flange 235 and short spool 238, as shown in FIG. 25E. Once bridge connector header 230 is correctly aligned, all bolts and connections are securely tightened. As shown in FIG. 25D, frac manifold connector 400 may already be attached to upper opening 230b at the time bridge connector header 230 is attached to upper threaded flange 235. Alternatively, frac manifold connector 400 may be attached to upper opening 230b at some time after bridge connector 230 has been attached to upper threaded flange 235.

Figure 26A:
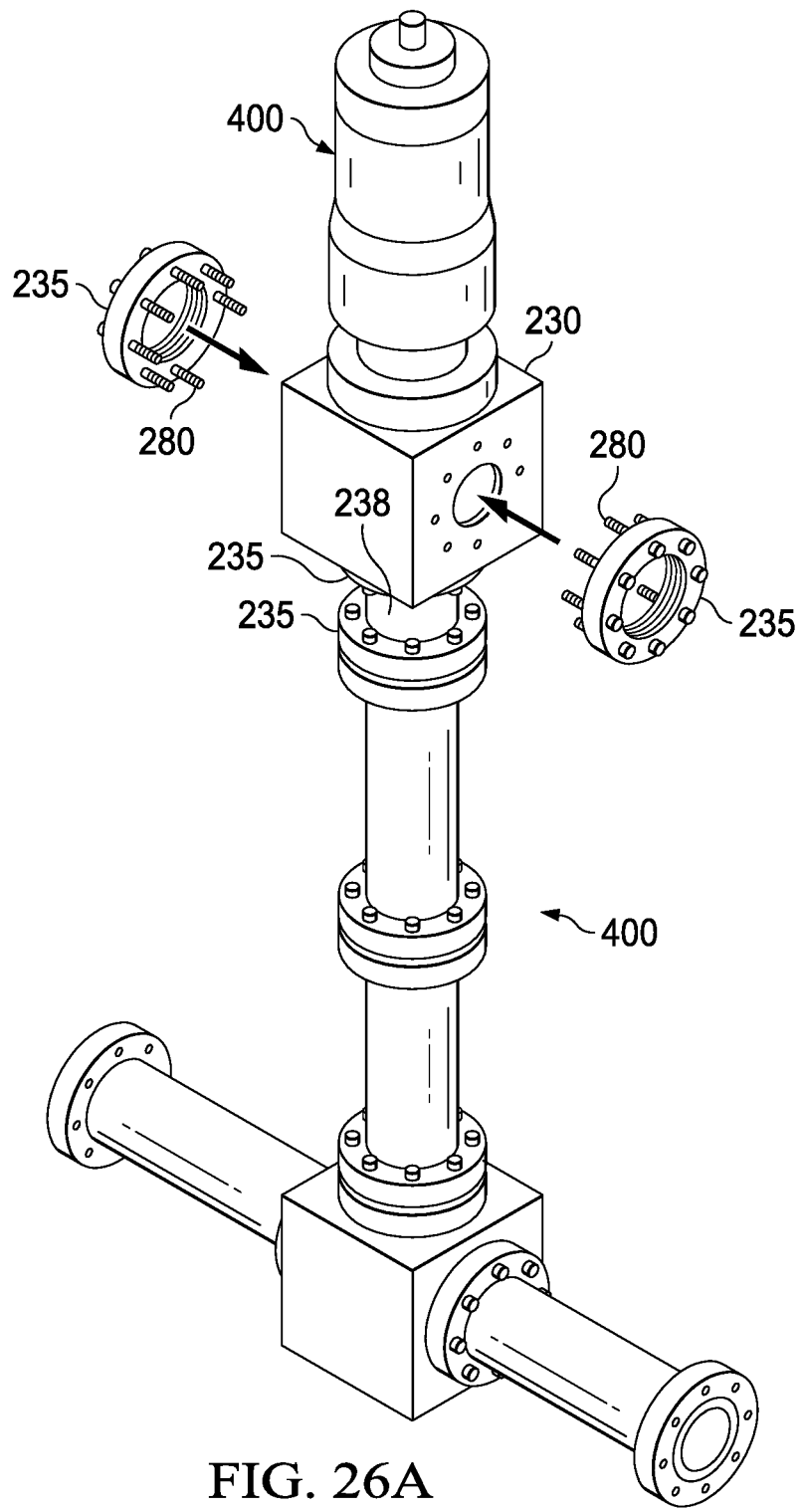
FIGS. 26A-26E illustrate one method of installing short spools, threaded flanges, and studded blocks on either side of the axial throughbore of a T-junction.
Figure 26B:
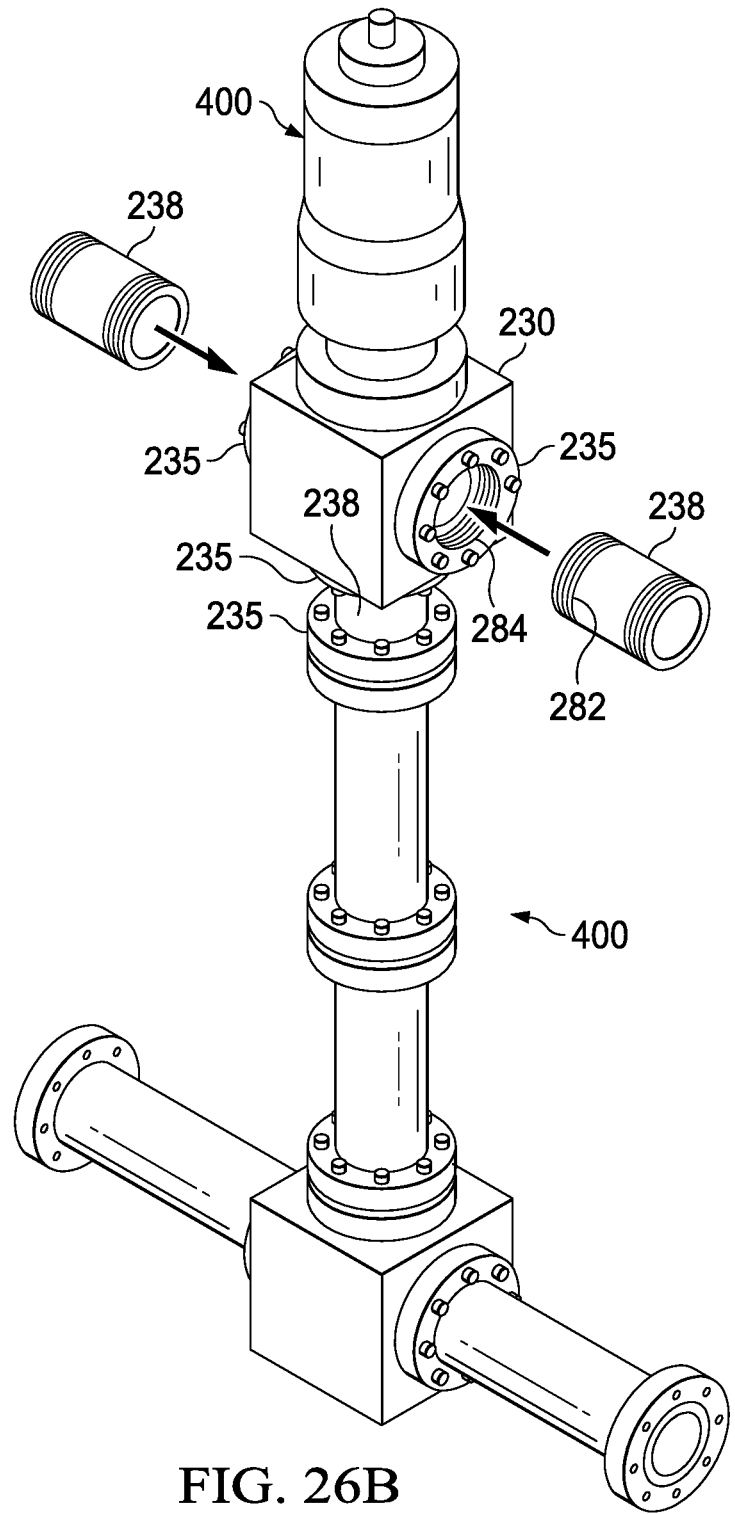
Figure 26C:
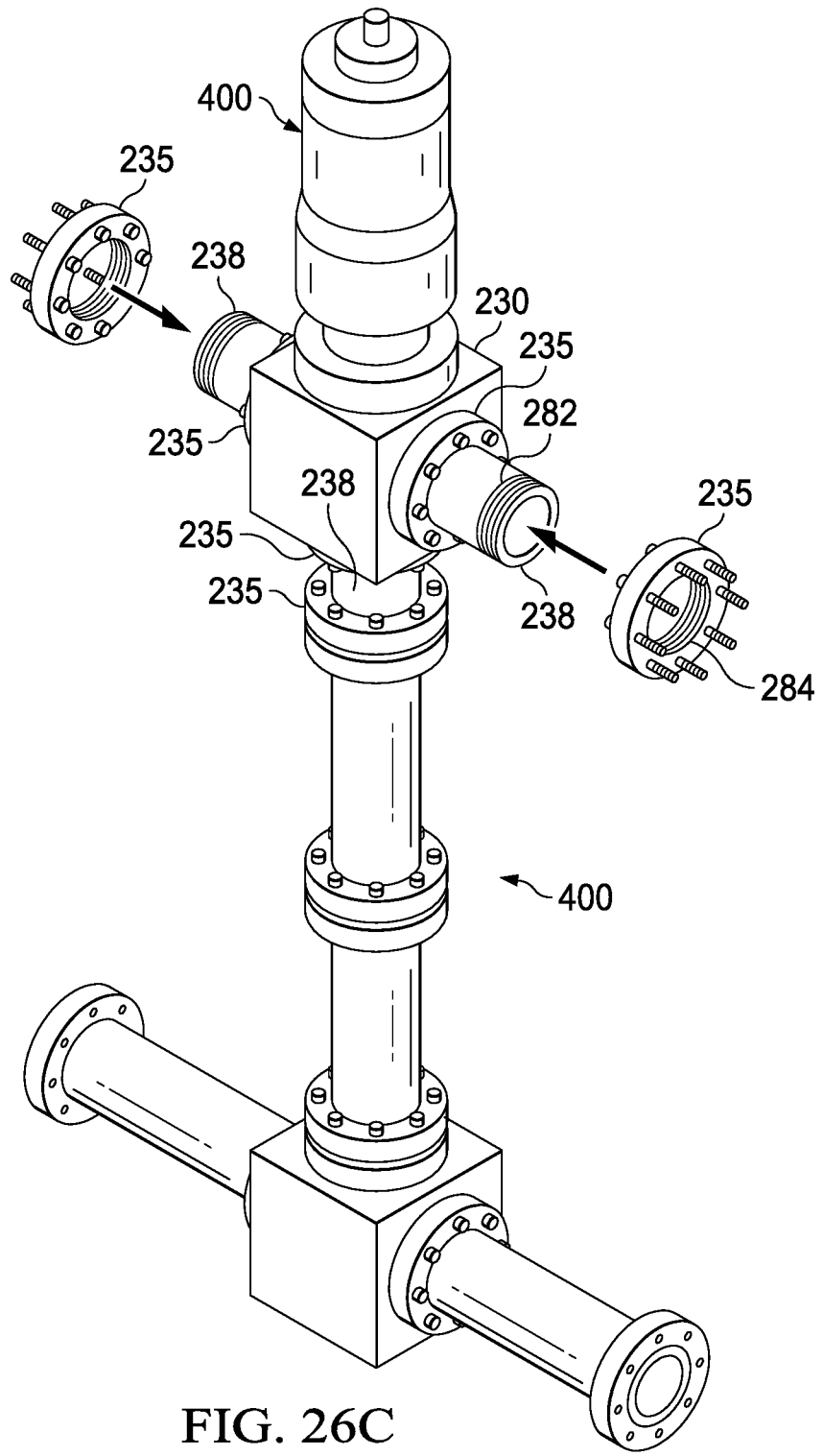
Figure 26D:
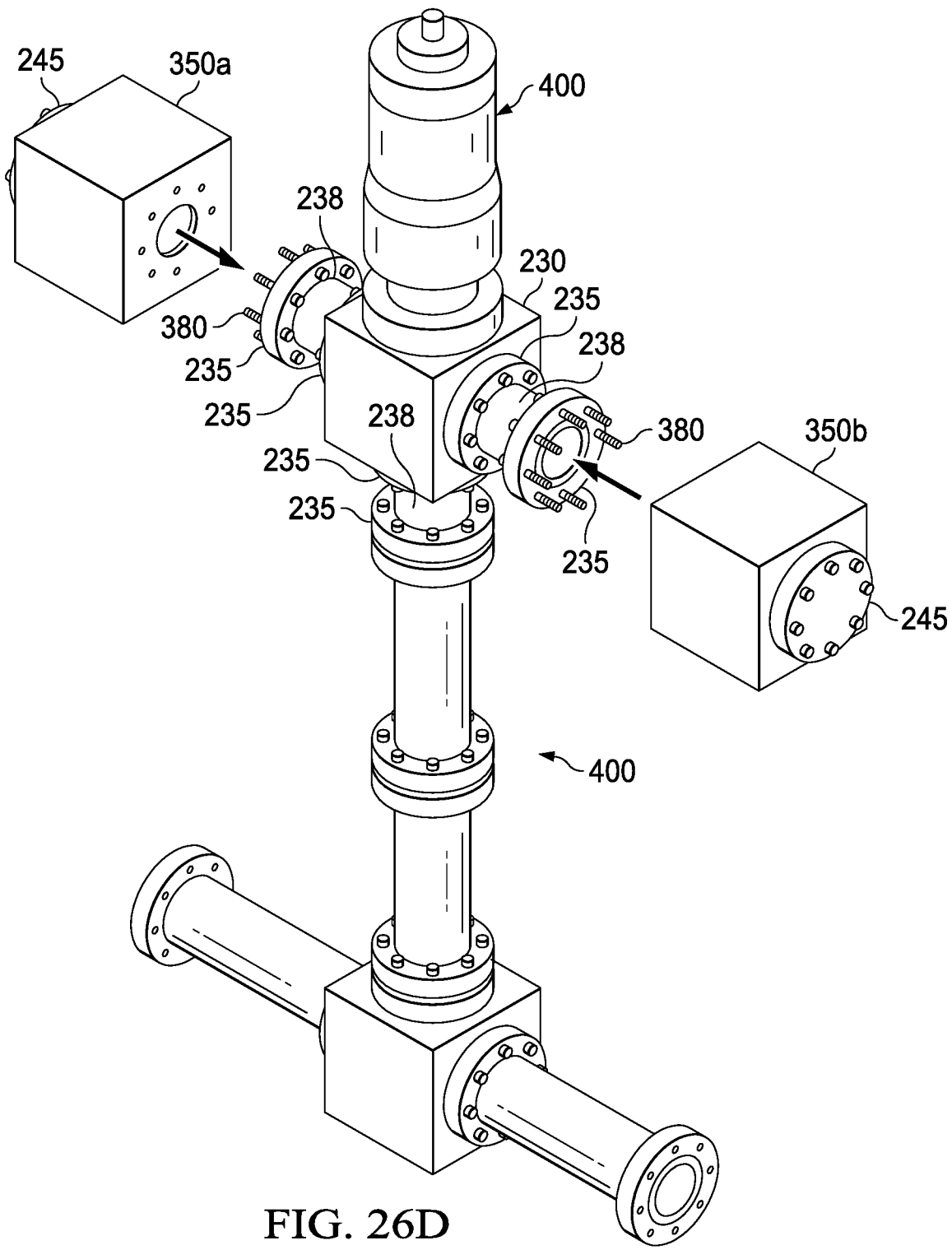
Figure 26E:
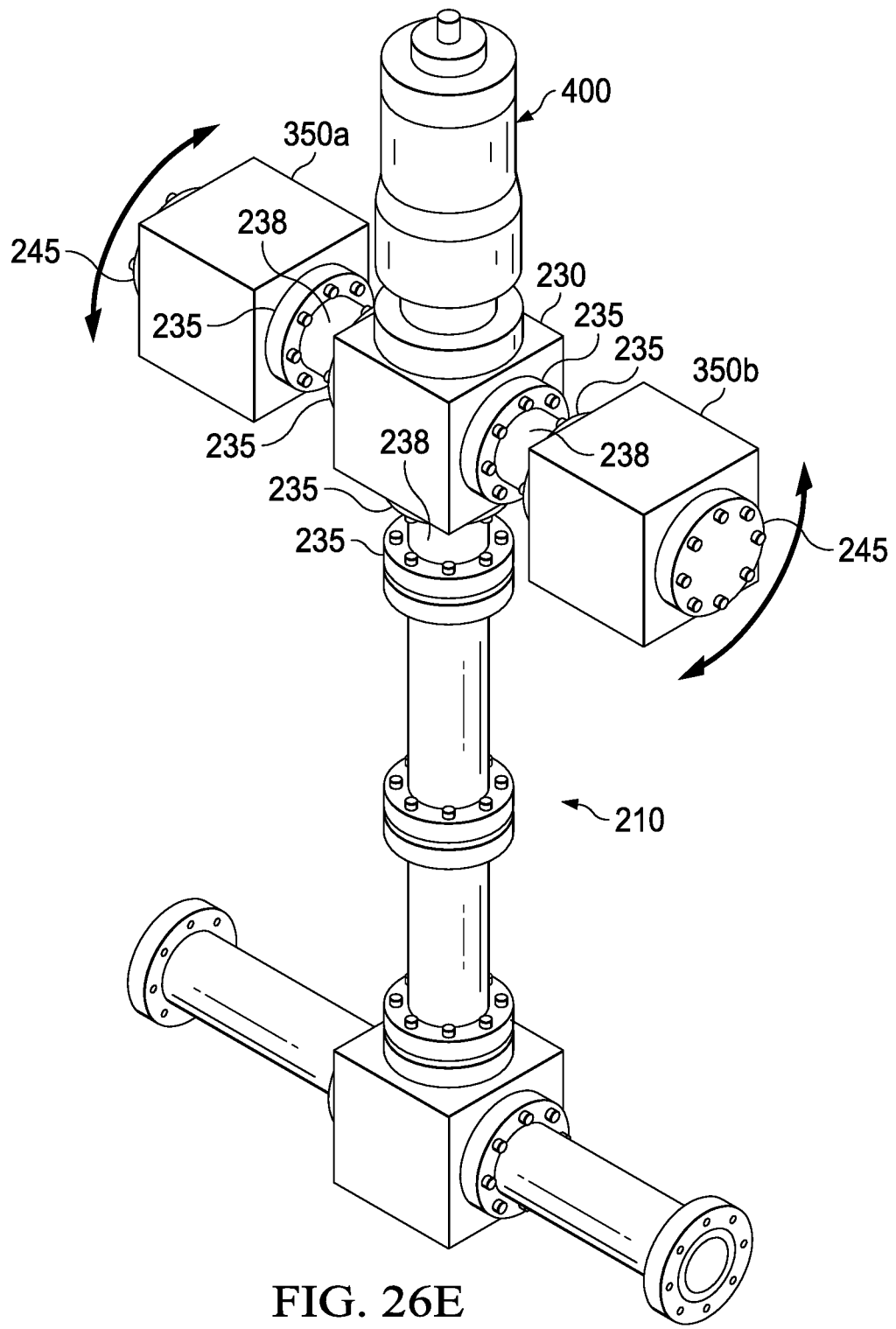

In this installation method, the next step, as shown in FIG. 26A, is to securely attach an inner threaded flange 235 on either side of bridge connector header 230, using bolts 380. Next, as shown in FIG. 26B, a short spool 238 is attached to each threaded flange 235 by rotating short spool 238 until the threaded portion 282 is fully engaged with the complementary threaded portion 284 of threaded flange 235. Next, as shown in FIG. 26C, an outer threaded flange 235 is attached to each short spool 238 by rotating outer threaded flange 235 until the threaded portion 284 is engaged with the complementary threaded portion 282 of short spool 238. Next, as shown in FIG. 26D, each outer threaded flange 235 is attached to a studded block 350a or 350b using bolts 380. At this point, if necessary, studded blocks 350a and 350b are rotated vertically about the z-axis, such that they align correctly with the studded blocks 350c and 350d on the frac tree to which the bridge spools are intended to connect. Such vertical rotation is accomplished by the threaded connection between outer threaded flanges 235 and short spools 238, as shown in FIG. 26E. Once studded blocks 350a and 350b are correctly aligned, all bolts and connections are securely tightened. During this stage of the installation process, bridge spools 255a and 255b may be attached to studded blocks 350a and 350b either before or after studded blocks 350a and 350b are attached to outer threaded flanges 235.

In another installation method, the bridge spools 255a and 255b, studded blocks 350a and 350b, bridge connector header 230, and frac tree header 270 may all be pre-assembled at the well site. A crane is used to lower the entire assembly onto the well configuration unit 210 and the frac tree 200, where it may be connected. If there are elevation differences between the bridge connector header 230 and the frac tree header 270, the rotating threaded flanges 235 may be used to adjust the elevation at either end.

The zipper bridge is superior to other methods of connecting the zipper manifold to the frac trees for multiple reasons. Because its orientation may be adjusted in one or both of the azimuthal and vertical directions, it can accommodate variations in the distance between and configuration of different frac manifolds and frac trees. Because it comprises two bridge spools, it does not require the multiple downlines used in many prior art systems. It is easier to install and more stable than other large-diameter hardline connections because its design is simpler and does not involve post-installation adjustments, and also because it is symmetrical about a line running from the well configuration unit to the frac tree. Because it comprises two flow lines that enter the frac tree header from opposite directions, it decreases the risk of erosion as compared to prior art systems using a single flow line.

Optionally, the present invention may also include one or more diverters in the flow stream. Referring generally to FIG. 2, as fluid flows up from frac manifold 104, through short spool 238 and into bridge connector header 230, the flow is along the y-axis, such that it is orthogonal to the z-axis, which passes through short spools 238 that lead away from bridge connector header 230 and towards studded blocks 350a and 350b. As a result, the flow has a tendency to become turbulent as it shifts from the y-axis to the z-axis. This turbulence, as well as other dynamic flow characteristics of this configuration, can lead to increased erosion and premature failure of bridge connector header 230 and short spools 238.

As shown in FIGS. 14-16, the cup tool 260, 1260, or 2260 of frac manifold connector 400 may comprise lower surfaces 1701 and/or 1702, which will generally redirect a portion of the upward flow to from the y-axis to the z-axis. This redirection may decrease the turbulence of the flow as it shifts from the y-axis to the z-axis, and thus decrease the erosion of bridge connection header 230 and short spools 238. Lower surfaces 1701 and/or 1702 may be concave, planar, conical, or any other configuration.

Figure 27A:
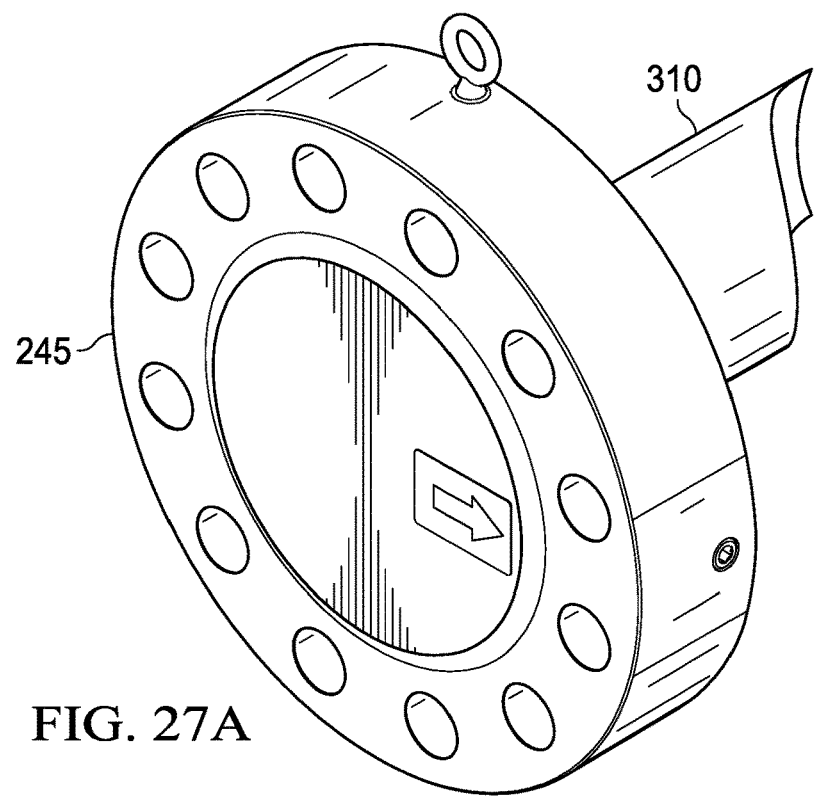
FIGS. 27A-27B illustrate a flow diverters that may be included on the interior surface of a blind flange attached to a studded block.
Figure 27B:
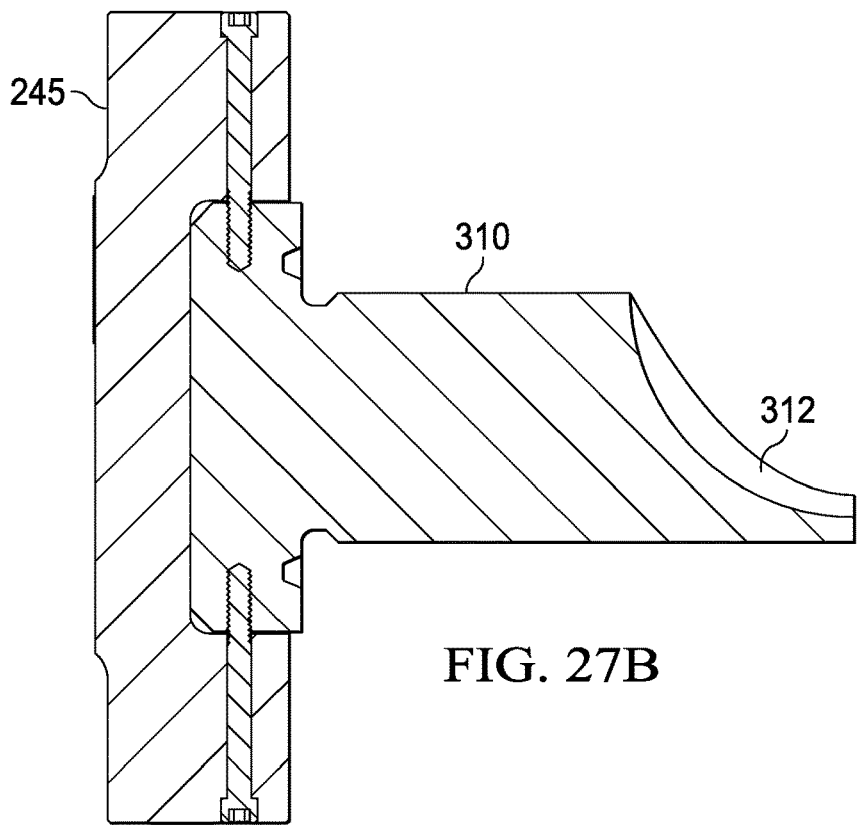

Referring now to FIGS. 27A-27B, either or both blind flange 245 may include flow diverter 310, with diverting surface 312. Flow diverter 310 may be generally cylindrical with a central axis along the z-axis, as shown in FIG. 2. Diverting surface 312 may be curvilinear and is preferably concave. Alternatively, diverting surface may be concave, planar, or any other configuration. Flow diverter 310 may also have a plurality of diverting surfaces.

As fluid flows through short spools 238 and into studded blocks 350a and 350b, it again shifts direction, this time from the z-axis to the x-axis, which is coaxial with bridge spools 255a and 255b. This transition will also cause turbulence and thus the potential for erosion within studded blocks 350a and 350b. With the use of the alternative embodiment of blind flange 245, as shown in FIG. 27A-27B, the flow along the z-axis will impact diverting surface 312, which will redirect a portion of the flow from the z-axis to the x-axis, and thus decrease the erosion of studded blocks 350a and 350b.

Although lower surfaces 1701 and 1702 and flow diverter 310 may also experience erosion, replacement of cup tool 260, 1260, or 2260 or blind flange 245 is much easier and less expensive than replacing bridge connector header 230, short spools 238, and/or studded blocks 350a and 350b.

It is understood that variations may be made in the foregoing without departing from the scope of the present disclosure. In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

Any spatial references, such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above. Similarly, references to the general shape of certain components, such as for example, "planar" or "cylindrical," are for the purpose of illustration only and do not limit the specific configuration of the structure described above.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes, and/or procedures may be merged into one or more steps, processes and/or procedures.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112, paragraph 6 for any limitations of any of the claims herein, except for those in which the claim expressly uses the word "means" together with an associated function.

The invention claimed is:

1. A system for connecting a zipper manifold to a frac tree, said system comprising two or more well configuration units, each well configuration unit comprising:
    a bridge connector header comprising an axial throughbore and a horizontal throughbore;
    a frac manifold connector connected to the bridge connector header and comprising:
        a first mandrel comprising a first end and a second end;
        a sealing element adjacent to the first mandrel and adapted to sealingly engage, at a pack-off location, an inner portion of the well configuration unit located below the horizontal throughbore of the bridge connector header; and
        one or more first hydraulic setting cylinders configured to move the first mandrel through the axial throughbore to position the first mandrel and sealing element at the pack-off location; and
    a bridge connector comprising:
        first and second connection blocks in fluid communication with the bridge connector header; and
        first and second bridge spools attached to, and in fluid communication with, the first and second connection blocks respectively;
        wherein the first and second bridge spools are both configured to connect the zipper manifold to the same frac tree.

2. The system of claim 1, further comprising a lower spool in fluid communication with the axial throughbore of the bridge connector header.

3. The system of claim 2, wherein the lower spool is attached to the bridge connector header by a threaded flange.

4. The system of claim 1, further comprising first and second connector spools, each of which is in fluid communication with one end of the horizontal throughbore of the bridge connector header, and both of which are attached to the bridge connector header by a threaded flange.

5. The system of claim 1, wherein the frac manifold connector further comprises a lower surface configured to divert flow entering the axial throughbore of the bridge connector header.

6. The system of claim 5, wherein the lower surface is concave.

7. The system of claim 1, wherein the second end of the first mandrel comprises a first area and the zipper manifold further comprises:
    a second mandrel comprising:
        a first housing comprising an upper surface with a second area, an inner chamber, and a lower surface; and
        a second housing comprising a lower surface with a third area;
    wherein:
        the first mandrel further comprises:
            a rod disposed within the second housing of the second mandrel; and
            an annular portion comprising an upper surface with a fourth area and disposed within the inner chamber of the first housing of the second mandrel.

8. The system of claim 7, wherein the ratio between the fourth area and the first area is greater than the ratio between the second area and the third area.

9. The system of claim 7, wherein the first mandrel further comprises a mandrel stop configured to engage the hydraulic setting cylinder when the sealing element has been axially positioned at the pack-off location.

10. A method of operating a zipper manifold, comprising the steps of:
    installing on a zipper manifold two or more well configuration units, each well configuration unit comprising:
        a bridge connector header comprising an axial throughbore and a horizontal throughbore;
        a frac manifold connector connected to the bridge connector header and comprising:
            a first mandrel comprising a first end and a second end;
            a sealing element adjacent to the first mandrel and adapted to sealingly engage, at a pack-off location, an inner portion of the well configuration unit located below the horizontal throughbore of the bridge connector header; and
            one or more first hydraulic setting cylinders configured to move the first mandrel through the axial throughbore to position the first mandrel and sealing element at the pack-off location; and
        a bridge connector comprising:
            first and second connection blocks in fluid communication with the bridge connector header; and
            first and second bridge spools attached to, and in fluid communication with, the first and second connection blocks respectively;
            wherein the first and second bridge spools are both configured to connect the zipper manifold to the same frac tree.

11. The method of claim 10, wherein:
    the first mandrel further comprises a first surface and a second surface;
    the frac manifold connector further comprises a second mandrel comprising, a first surface, an inner chamber, and a second surface; and
    wherein the well configuration unit is configured such that a first upward force is exerted on the second surface of the first mandrel and a second upward force is exerted on the second surface of the second mandrel; and the method further comprises the step of exerting a first downward force on the first surface of the first mandrel and a second downward force on the first surface of the second mandrel;

wherein the ratio of the first downward force to the first upward force is greater than the ratio of the second downward force to the second upward force.

* * * * *